United States Patent
Tsuji et al.

(10) Patent No.: US 10,623,884 B2
(45) Date of Patent: Apr. 14, 2020

(54) INFORMATION PROCESSING APPARATUS, INFORMATION PROCESSING METHOD, AND PROGRAM

(71) Applicant: Sony Corporation, Tokyo (JP)

(72) Inventors: Minoru Tsuji, Chiba (JP); Toru Chinen, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/446,450

(22) Filed: Jun. 19, 2019

(65) Prior Publication Data

US 2019/0306653 A1    Oct. 3, 2019

Related U.S. Application Data

(63) Continuation of application No. 16/265,151, filed on Feb. 1, 2019, which is a continuation of application
(Continued)

(51) Int. Cl.
*H04S 7/00* (2006.01)
*H04S 5/02* (2006.01)
(Continued)

(52) U.S. Cl.
CPC ............ *H04S 7/40* (2013.01); *H04N 13/30* (2018.05); *H04S 5/02* (2013.01); *H04S 7/303* (2013.01);
(Continued)

(58) Field of Classification Search
CPC ... H04S 7/40; H04S 5/05; H04S 7/303; H04S 2400/11; H04N 13/30; G10L 19/008; G10L 21/0202

See application file for complete search history.

(56) References Cited

U.S. PATENT DOCUMENTS

| 10,356,547 B2 * | 7/2019 | Tsuji et al. ............... H04S 7/40 381/306 |
| 2011/0123055 A1 | 5/2011 | Deshpande |

(Continued)

FOREIGN PATENT DOCUMENTS

| CN | 1717955 A | 1/2006 |
| CN | 102075832 A | 5/2011 |

(Continued)

OTHER PUBLICATIONS

International Search Report and English translation thereof dated Sep. 27, 2016 in connection with International Application No. PCT/JP2016/069594.
(Continued)

*Primary Examiner* — Andrew L Sniezek
(74) *Attorney, Agent, or Firm* — Wolf, Greenfield & Sacks, P.C.

(57) ABSTRACT

The present technique relates to an information processing apparatus, an information processing method, and a program capable of performing appropriate remapping.

An offset angle calculation section calculates an offset amount of a position of a reference screen from a reference position present in a front direction of a user, and a position information correction section corrects a position of an audio object referred with the reference position, in conformity with the position of the reference screen on the basis of the offset amount. Furthermore, an object remapping section remaps the position of the audio object in conformity with a position of a reproduction screen on the basis of the corrected position of the audio object. The present technique can be applied to an information processing apparatus.

3 Claims, 20 Drawing Sheets

Related U.S. Application Data

No. 15/742,944, filed as application No. PCT/JP2016/069594 on Jul. 1, 2016, now Pat. No. 10,356,547.

(51) Int. Cl.
  *H04N 13/30* (2018.01)
  *G10L 19/008* (2013.01)
  *G10L 21/02* (2013.01)

(52) U.S. Cl.
  CPC ........ *G10L 19/008* (2013.01); *G10L 21/0202* (2013.01); *H04S 2400/11* (2013.01)

(56) References Cited

U.S. PATENT DOCUMENTS

| | | |
|---|---|---|
| 2013/0236039 A1 | 9/2013 | Jax et al. |
| 2015/0208190 A1 | 7/2015 | Hooks et al. |
| 2016/0080884 A1 | 3/2016 | Song et al. |
| 2016/0205492 A1 | 7/2016 | Keller et al. |
| 2017/0011751 A1 | 1/2017 | Fueg et al. |
| 2018/0048977 A1 | 2/2018 | Song et al. |
| 2018/0234786 A1 | 8/2018 | Tsuji et al. |
| 2019/0166449 A1 | 5/2019 | Tsuji et al. |

FOREIGN PATENT DOCUMENTS

| | | |
|---|---|---|
| CN | 102421054 A | 4/2012 |
| CN | 103313182 A | 9/2013 |
| CN | 103650535 A | 3/2014 |
| CN | 104604258 A | 5/2015 |
| JP | 2013-187908 A | 9/2013 |
| KR | 10-2013-0102015 A | 9/2013 |
| PT | 1568251 E | 4/2007 |
| WO | WO 2014/035903 A1 | 3/2014 |
| WO | WO 2014/175668 A1 | 10/2014 |

OTHER PUBLICATIONS

Written Opinion and English translation thereof dated Sep. 27, 2016 in connection with International Application No. PCT/JP2016/069594.

International Preliminary Report on Patentability and English translation thereof dated Jan. 25, 2018 in connection with International Application No. PCT/JP2016/069594.

Korean Office Action in connection with Korean Application No. 10-2018-7000727 dated Mar. 20, 2018 and English translation thereof.

European Search Report dated Feb. 12, 2019 in connection with European Application No. 16824293.1.

Füg et al., Local Screen Information Interface and Screen-Related Object Remapping, International Organization for Standardization, MPEG Meeting Jul. 7, 2014-Jul. 11, 2014, Sapporo, ISO/IEC/JTC1/SC29/WG11, No. M34296, Jul. 3, 2014, 9 pages.

No Author Listed, Information technology—High efficiency coding and media delivery in heterogeneous environments—Part 3: 3D audio, Draft International Standard ISO/IEC DIS 23008-3, ISO/IEC JTC 1/SC 29/WG 11, Jul. 25, 2014, 433 pages.

No Author Listed, International Standard ISO/IEC 23008-3, Information technology—High efficiency coding and media delivery in heterogeneous environments—Part 3: 3D audio, First edition Oct. 15, 2015, corrected version Feb. 1, 2016, ISO/IEC 23008-3:2015(E), 439 pages.

Shi et al., Screen-Related Object Remapping for Zooming, International Organization for Standardization, MPEG Meeting Jul. 7, 2014-Jul. 11, 2014, Sapporo, ISO/IEC/JTC1/SC29/WG11, No. M34253, Jul. 3, 2014, 12 pages.

Chinese Office Action dated Oct. 28, 2019 in connection with Chinese Application No. 201680040576.8 and English translation thereof.

Extended European Search Report dated Feb. 26, 2020 in connection with European Application No. 20150228.3.

\* cited by examiner

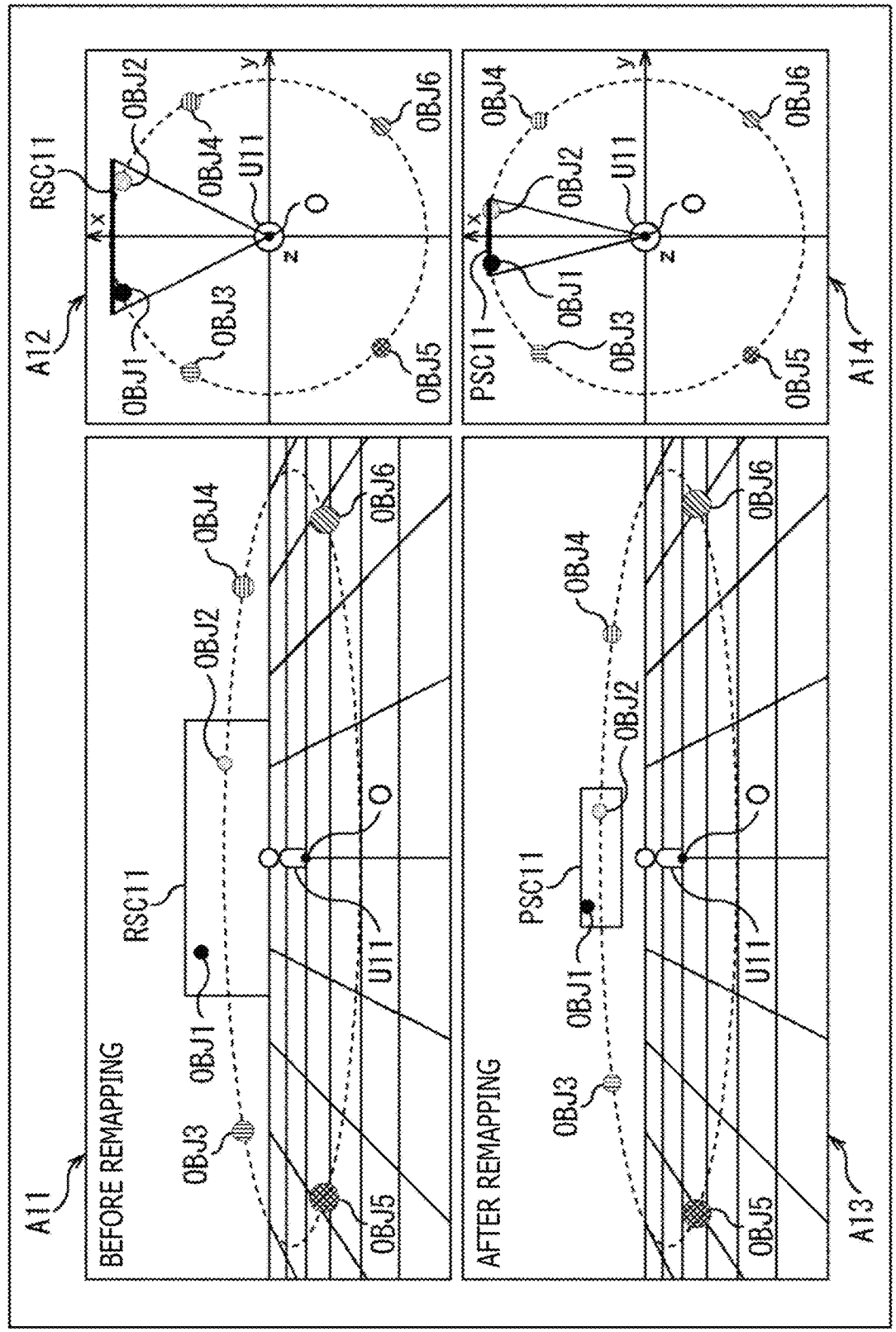

| REFERENCE SCREEN INFORMATION | | Azimuth LEFT END | 29.0 |
| --- | --- | --- | --- |
| | | Azimuth RIGHT END | −29.0 |
| | | Elevation UPPER END | 17.5 |
| | | Elevation LOWER END | −17.5 |
| OBJECT POSITION INFORMATION | OBJ1 | Azimuth | 20.0 |
| | | Elevation | 10.0 |
| | OBJ2 | Azimuth | −20.0 |
| | | Elevation | 0.0 |
| | OBJ3 | Azimuth | 60.0 |
| | | Elevation | 0.0 |
| | OBJ4 | Azimuth | −60.0 |
| | | Elevation | 0.0 |
| | OBJ5 | Azimuth | 135.0 |
| | | Elevation | 0.0 |
| | OBJ6 | Azimuth | −135.0 |
| | | Elevation | 0.0 |

Q12

| REPRODUCTION SCREEN INFORMATION | Azimuth LEFT END | 14.5 |
| --- | --- | --- |
| | Azimuth RIGHT END | −14.5 |
| | Elevation UPPER END | 8.5 |
| | Elevation LOWER END | −8.5 |

FIG.4

| OBJECT POSITION INFORMATION AFTER REMAPPING | OBJ1 | Azimuth | 10.0 |
| --- | --- | --- | --- |
| | | Elevation | 4.9 |
| | OBJ2 | Azimuth | −10.0 |
| | | Elevation | 0.0 |
| | OBJ3 | Azimuth | 48.5 |
| | | Elevation | 0.0 |
| | OBJ4 | Azimuth | −48.5 |
| | | Elevation | 0.0 |
| | OBJ5 | Azimuth | 130.7 |
| | | Elevation | 0.0 |
| | OBJ6 | Azimuth | −130.7 |
| | | Elevation | 0.0 |

FIG. 5

| | | Azimuth LEFT END | 59.0 |
|---|---|---|---|
| REFERENCE SCREEN INFORMATION | | Azimuth RIGHT END | 1.0 |
| | | Elevation UPPER END | 17.5 |
| | | Elevation LOWER END | −17.5 |
| OBJECT POSITION INFORMATION | OBJ1 | Azimuth | 50.0 |
| | | Elevation | 10.0 |
| | OBJ2 | Azimuth | 10.0 |
| | | Elevation | 0.0 |
| | OBJ3 | Azimuth | 90.0 |
| | | Elevation | 0.0 |
| | OBJ4 | Azimuth | −30.0 |
| | | Elevation | 0.0 |
| | OBJ5 | Azimuth | 165.0 |
| | | Elevation | 0.0 |
| | OBJ6 | Azimuth | −105.0 |
| | | Elevation | 0.0 |

Q21

Q22

| | Azimuth LEFT END | 14.5 |
|---|---|---|
| REPRODUCTION SCREEN INFORMATION | Azimuth RIGHT END | −14.5 |
| | Elevation UPPER END | 8.5 |
| | Elevation LOWER END | −8.5 |

FIG.6

| OBJECT POSITION INFORMATION AFTER REMAPPING | OBJ1 | Azimuth | 10.0 |
| --- | --- | --- | --- |
| | | Elevation | 4.9 |
| | OBJ2 | Azimuth | −10.0 |
| | | Elevation | 0.0 |
| | OBJ3 | Azimuth | 56.9 |
| | | Elevation | 0.0 |
| | OBJ4 | Azimuth | −42.8 |
| | | Elevation | 0.0 |
| | OBJ5 | Azimuth | 159.5 |
| | | Elevation | 0.0 |
| | OBJ6 | Azimuth | −111.4 |
| | | Elevation | 0.0 |

FIG.9

| | OBJ1 | Azimuth | 10.0 |
| --- | --- | --- | --- |
| | | Elevation | 4.9 |
| | OBJ2 | Azimuth | −10.0 |
| | | Elevation | 0.0 |
| | OBJ3 | Azimuth | 48.5 |
| OBJECT POSITION INFORMATION AFTER REMAPPING | | Elevation | 0.0 |
| | OBJ4 | Azimuth | −48.5 |
| | | Elevation | 0.0 |
| | OBJ5 | Azimuth | 130.7 |
| | | Elevation | 0.0 |
| | OBJ6 | Azimuth | −130.7 |
| | | Elevation | 0.0 |

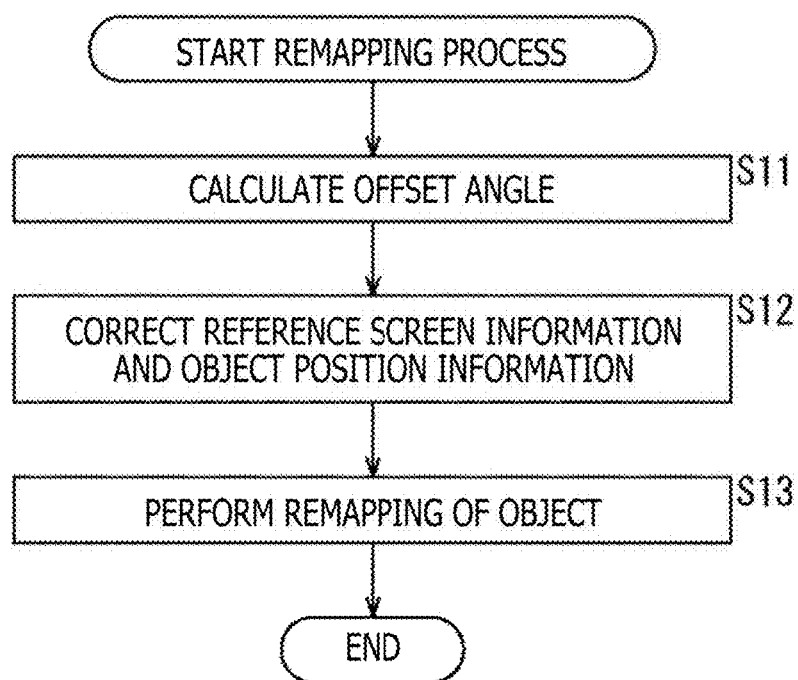

| REFERENCE SCREEN INFORMATION | | Azimuth LEFT END | −151.0 |
| --- | --- | --- | --- |
| | | Azimuth RIGHT END | 151.0 |
| | | Elevation UPPER END | 17.5 |
| | | Elevation LOWER END | −17.5 |
| OBJECT POSITION INFORMATION | OBJ1 | Azimuth | −160.0 |
| | | Elevation | 10.0 |
| | OBJ2 | Azimuth | 160.0 |
| | | Elevation | 0.0 |
| | OBJ3 | Azimuth | −120.0 |
| | | Elevation | 0.0 |
| | OBJ4 | Azimuth | 120.0 |
| | | Elevation | 0.0 |
| | OBJ5 | Azimuth | −45.0 |
| | | Elevation | 0.0 |
| | OBJ6 | Azimuth | 45.0 |
| | | Elevation | 0.0 |

Q32

| REPRODUCTION SCREEN INFORMATION | Azimuth LEFT END | 14.5 |
| --- | --- | --- |
| | Azimuth RIGHT END | −14.5 |
| | Elevation UPPER END | 8.5 |
| | Elevation LOWER END | −8.5 |

FIG.13

| | | | |
|---|---|---|---|
| OBJECT POSITION INFORMATION AFTER REMAPPING | OBJ1 | Azimuth | 10.0 |
| | | Elevation | 4.9 |
| | OBJ2 | Azimuth | −10.0 |
| | | Elevation | 0.0 |
| | OBJ3 | Azimuth | 48.5 |
| | | Elevation | 0.0 |
| | OBJ4 | Azimuth | −48.5 |
| | | Elevation | 0.0 |
| | OBJ5 | Azimuth | 130.7 |
| | | Elevation | 0.0 |
| | OBJ6 | Azimuth | −130.7 |
| | | Elevation | 0.0 |

FIG. 15

| | | Azimuth LEFT END | 59.0 |
|---|---|---|---|
| REFERENCE SCREEN INFORMATION Q41 | | Azimuth RIGHT END | 1.0 |
| | | Elevation UPPER END | 17.5 |
| | | Elevation LOWER END | −17.5 |
| OBJECT POSITION INFORMATION | OBJ1 | Azimuth | 50.0 |
| | | Elevation | 10.0 |
| | OBJ2 | Azimuth | 10.0 |
| | | Elevation | 0.0 |
| | OBJ3 | Azimuth | 90.0 |
| | | Elevation | 0.0 |
| | OBJ4 | Azimuth | −30.0 |
| | | Elevation | 0.0 |
| | OBJ5 | Azimuth | 165.0 |
| | | Elevation | 0.0 |
| | OBJ6 | Azimuth | −105.0 |
| | | Elevation | 0.0 |

| | Azimuth LEFT END | −165.5 |
|---|---|---|
| REPRODUCTION SCREEN INFORMATION Q42 | Azimuth RIGHT END | 165.0 |
| | Elevation UPPER END | 8.5 |
| | Elevation LOWER END | −8.5 |

FIG.16

| | OBJ1 | Azimuth | −170.0 |
| --- | --- | --- | --- |
| | | Elevation | 4.9 |
| | OBJ2 | Azimuth | 170.0 |
| | | Elevation | 0.0 |
| | OBJ3 | Azimuth | −131.5 |
| OBJECT POSITION INFORMATION AFTER REMAPPING | | Elevation | 0.0 |
| | OBJ4 | Azimuth | 131.5 |
| | | Elevation | 0.0 |
| | OBJ5 | Azimuth | −49.3 |
| | | Elevation | 0.0 |
| | OBJ6 | Azimuth | 49.3 |
| | | Elevation | 0.0 |

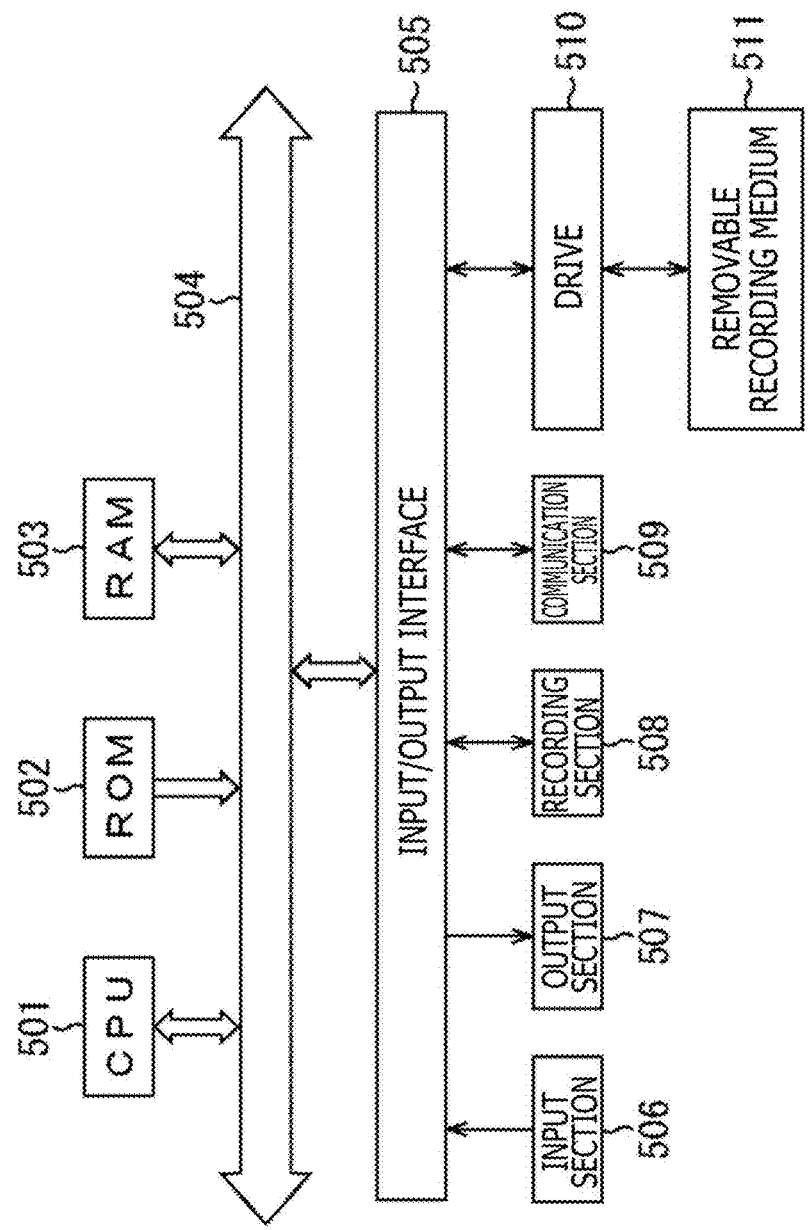

INFORMATION PROCESSING APPARATUS, INFORMATION PROCESSING METHOD, AND PROGRAM

CROSS-REFERENCE TO RELATED APPLICATIONS

This application is a continuation of and claims the benefit under 35 U.S.C. § 120 of U.S. patent application Ser. No. 16/265,151, titled "INFORMATION PROCESSING APPARATUS, INFORMATION PROCESSING METHOD, AND PROGRAM," filed Feb. 1, 2019, which is a continuation of U.S. patent application Ser. No. 15/742,944, titled "INFORMATION PROCESSING APPARATUS, INFORMATION PROCESSING METHOD, AND PROGRAM," filed Jan. 9, 2018, now U.S. Pat. No. 10,356,547, which is a National Stage of International Application No. PCT/JP2016/069594, filed in the Japanese Patent Office as a Receiving office on Jul. 1, 2016, which claims priority to Japanese Patent Application Number 2015-198582, filed in the Japanese Patent Office on Oct. 6, 2015 and Japanese Patent Application Number 2015-142253, filed in the Japanese Patent Office on Jul. 16, 2015, each of which is hereby incorporated by reference in its entirety.

TECHNICAL FIELD

The present technique relates to an information processing apparatus, an information processing method, and a program, and particularly relates to an information processing apparatus, an information processing method, and a program capable of performing appropriate remapping.

BACKGROUND ART

Conventionally, a Screen-Related Object Element Remapping technique has been adopted in ISO/IEC 23008-3 "3D Audio" standard (see, for example, NPL 1).

According to this technique, in rendering and reproduction of object audio, positions of audio objects are remapped (relocated) depending on reference screen information that indicates a position and a magnitude of a reference screen which serves as a reference and reproduction screen information that indicates a position and a magnitude of a reproduction screen actually reproduced. By doing so, if image reproduction is performed such that, for example, objects on the reference screen are displayed on the reproduction screen with a positional relation remaining unchanged, it is possible to localize audio images of those objects at the same positions as those of the objects on the reference screen.

CITATION LIST

Non Patent Literature

[NPL 1]
ISO/IEC DIS 23008-3 "Information technology-High efficiency coding and media delivery in heterogeneous environments-Part 3: 3D audio"

SUMMARY OF THE INVENTION

Technical Problem

Meanwhile, the above technique is premised on the fact that a central position of the reference screen is placed in front of a user in a reproduction space. However, in such a case as when an omnidirectional image, for example, that displays an image in all directions of 360° is reproduced or when a part of an entire image is subjected to zoom reproduction, the central position of the reference screen is not always placed in front of the user depending on situations.

In such a case, when the positions of the audio objects are remapped by the above technique, the positions after remapping are distorted. That is, a distortion occurs in a positional relation among the audio objects outside of the reproduction screen, and appropriate remapping cannot be realized.

The present technique has been made in the light of these situations and an object thereof is to be able to perform appropriate remapping.

Solution to Problem

An information processing apparatus according to one aspect of the present technique includes an offset calculation section that calculates an offset amount of a position of a reference screen from a reference position present in a front direction of a user, a position correction section that corrects a position of an audio object referred with the reference position, in conformity with the position of the reference screen on the basis of the offset amount, and a remapping section that remaps the position of the audio object in conformity with a position of a reproduction screen on the basis of the corrected position of the audio object.

The offset calculation section can be caused to correct the offset amount by a predetermined correction value when the reference screen is placed in a backward direction of the user.

The position correction section can be caused to adjust a correction value used during correction of the position of the audio object when a range of information that indicates the position of the audio object is specified as a range within a predetermined range.

The position correction section can be caused to correct the position of the reference screen on the basis of the offset amount, and the remapping section can be caused to remap the position of the audio object on the basis of the corrected position of the reference screen and the corrected position of the audio object.

An information processing method or a program according to one aspect of the present technique includes the steps of calculating an offset amount of a position of a reference screen from a reference position present in a front direction of a user, correcting a position of an audio object referred with the reference position, in conformity with the position of the reference screen on the basis of the offset amount, and remapping the position of the audio object in conformity with a position of a reproduction screen on the basis of the corrected position of the audio object.

According to one aspect of the present technique, an offset amount of a position of a reference screen from a reference position present in a front direction of a user is calculated, a position of an audio object referred with the reference position is corrected in conformity with the position of the reference screen on the basis of the offset amount, and the position of the audio object is remapped in conformity with a position of a reproduction screen on the basis of the corrected position of the audio object.

Advantageous Effect of Invention

According to one aspect of the present technique, it is possible to perform appropriate remapping.

It is noted that effects are not always limited to those described here but may be any of effects described in the present disclosure.

BRIEF DESCRIPTION OF DRAWINGS

FIG. 1 depicts positional relations among objects before and after remapping.

FIG. 2 depicts an example of reference screen information, object position information, and reproduction screen information.

FIG. 4 depicts an example of object position information after remapping.

FIG. 5 depicts an example of reference screen information, object position information, and reproduction screen information.

FIG. 6 depicts an example of object position information after remapping.

FIG. 9 depicts an example of object position information after remapping.

FIG. 11 is a flowchart for explaining a remapping process.

FIG. 12 depicts an example of reference screen information, object position information, and reproduction screen information.

FIG. 13 depicts an example of object position information after remapping.

FIG. 15 depicts an example of reference screen information, object position information, and reproduction screen information.

FIG. 16 depicts an example of object position information after remapping.

FIG. 20 depicts an example of a configuration of a computer.

DESCRIPTION OF EMBODIMENTS

Figure 3:
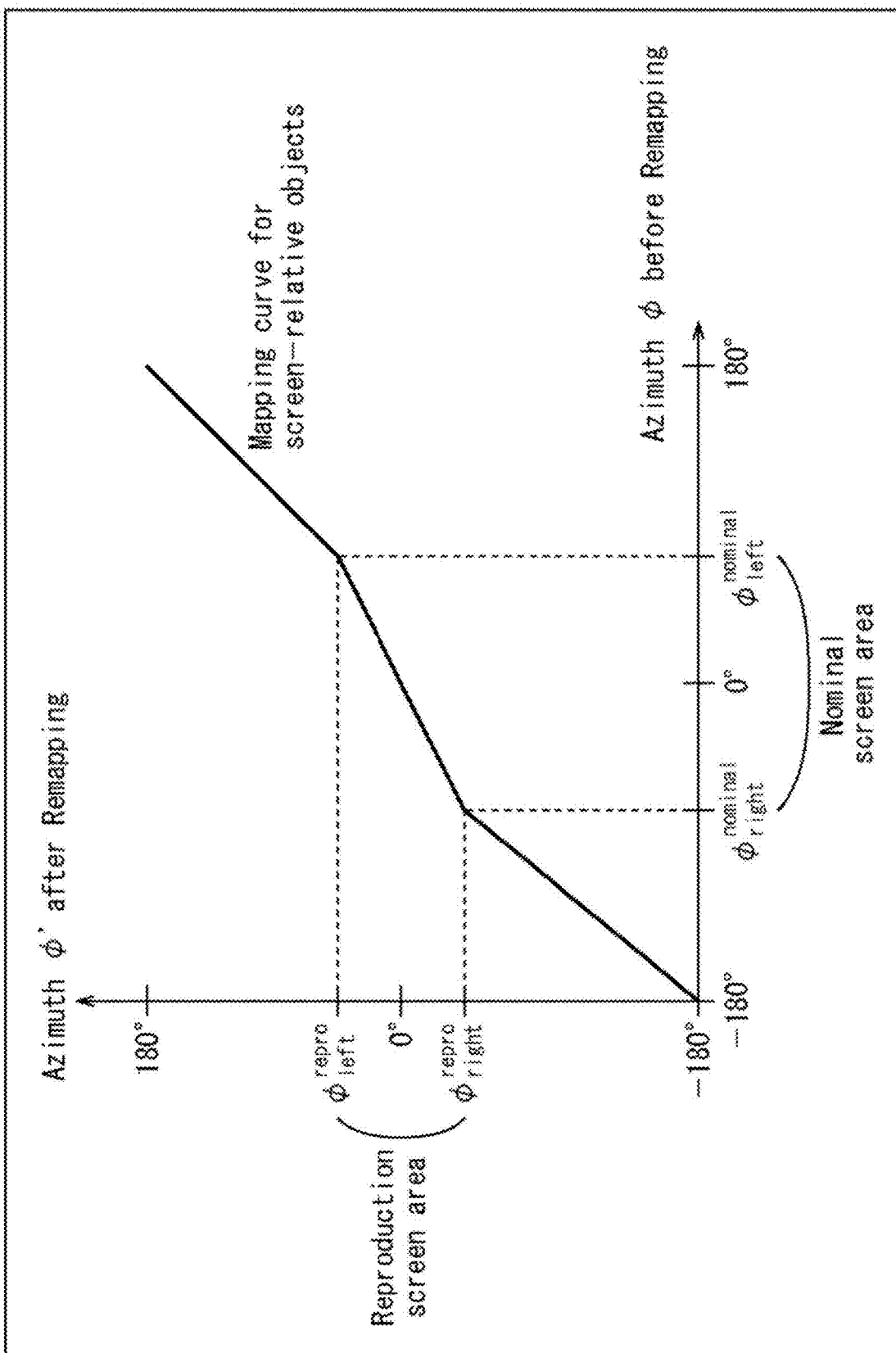
FIG. 3 is an explanatory diagram of a change in horizontal positions by remapping.

Embodiments to which the present technique is applied will be described hereinafter with reference to the drawings.

First Embodiment

Remapping

The present technique intends to be able to perform appropriate remapping when audio reproduction is performed by acquiring an audio signal of each audio object and metadata such as object position information that indicates a position of the audio object. It is noted that the audio object is often simply referred to as "object," hereinafter.

For example, when a content is reproduced, a bit stream for reproducing the content including a dynamic image and sounds accompanying the dynamic image is input to a content reproducing side. This bit stream is obtained by multiplexing, for example, video signals for reproducing a dynamic image, an audio signal for reproducing a sound of each object, and various pieces of information such as metadata of each object and reference screen information that indicates a position and a magnitude of a reference screen used as a reference. The metadata also includes at least object position information that indicates a position of each object in a reproduction space.

Reproduction screen information that indicates a position and a magnitude of a reproduction screen (display screen), which is a screen actually used to reproduce the content, in the reproduction space is also supplied to the content reproducing side. Then, at a time of content reproduction, remapping of the position of each object indicated by the object position information is performed on the basis of the reference screen information and the reproduction screen information.

Specifically, the remapping of object positions is performed as depicted in, for example, FIG. 1.

As indicated by an arrow A11, it is assumed that six objects OBJ1 to OBJ6 are located in such a manner as to surround a virtual user U11 present at a position of an origin O of the reproduction space. Here, the object OBJ1 to the object OBJ6 are located at positions on the reproduction space indicated by the object position information included in the metadata.

Furthermore, the reference screen information defines a reference screen RSC11 as a screen used as a reference. In this example, the reference screen RSC11 is placed in a front direction of the user U11. Note that it is assumed that the user U11 faces a direction in which the reference screen RSC11 is present, that is, the front direction.

When the object OBJ1 to the object OBJ6 and the reference screen RSC11 are viewed in a top-to-bottom direction in a view indicated by the arrow A11, located positions thereof are depicted in a view indicated by an arrow A12.

In this example, the object OBJ1 and the object OBJ2 are, in particular, placed within the reference screen RSC11. Furthermore, the object OBJ1, the object OBJ3, and the object OBJ5 are located to be bilaterally symmetric with the object OBJ2, the object OBJ4, and the object OBJ6 in a horizontal direction when being viewed from the user U11.

Therefore, supposing that the dynamic image that constitutes the content is reproduced on the reference screen RSC11, only the object OBJ1 and the object OBJ2 are displayed out of the six objects on the reference screen RSC11.

Now, in the view indicated by the arrow A12, it is assumed that the front direction when viewed from the user U11, that is, an upward direction in the view is a positive direction of an x-axis, a right direction when viewed from the user U11 is a positive direction of a y-axis, and a zenith direction when viewed from the user U11, that is, a direction of a near side in the view is a positive direction of a z-axis.

It is also assumed that a three-dimensional coordinate system using the origin O as an origin and having the x-axis, the y-axis, and the z-axis is an xyz coordinate system. It is further assumed that each object and the reference screen RSC11 are located on a unit sphere a center of which is the origin O and a radius of which is a predetermined distance r (hereinafter, also referred to as "radius r") from the origin O. Here, the radius r is, for example, 1.

In this case, it is assumed that the positions indicated by the object position information and the reference screen information are each represented by a horizontal angle Azimuth that is an angle with respect to the x-axis on an xy plane and a perpendicular angle Elevation that is an angle with respect to the x-axis on an xz plane. Note that, more specifically, the perpendicular angle Elevation is the angle formed between a line that connects a position of interest such as the position of each object to the origin O and the xy plane. It is further assumed that positions indicated by the reproduction screen information are similarly each represented by a horizontal angle Azimuth and a perpendicular angle Elevation.

Here, as for the horizontal angle Azimuth, it is assumed that the positive direction of the x-axis is at a horizontal angle Azimuth=0°, a clockwise direction in the view indicated by the arrow A12 is a negative direction of the horizontal angle Azimuth, and a counterclockwise direction is a positive direction of the horizontal angle Azimuth. Furthermore, −180°≤Azimuth≤180°.

For example, therefore, the positive direction of the y-axis is at a horizontal angle Azimuth=−90°, and a negative direction of the x-axis is at a horizontal angle Azimuth=−180°=180°.

As for the perpendicular angle Elevation, it is assumed that a position in the direction of the x-axis, that is, on the xy plane is at a perpendicular angle Elevation=0°, a rotation direction from the xy plane to the positive direction of the z-axis is a positive direction of the perpendicular angle Elevation, and a rotation direction from the xy plane to a negative direction of the z-axis is a negative direction of the perpendicular angle Elevation. Furthermore, −90°≤Elevation≤90°.

For example, therefore, the positive direction of the z-axis is at a perpendicular angle Elevation=90°, and the negative direction of the z-axis is at a perpendicular angle Elevation=−90°.

Moreover, it is assumed hereinafter that a position of an intersecting point between the unit sphere and the x-axis on the positive-direction side of the x-axis is a reference position in the reproduction space. That is, the reference position is a position at the horizontal angle Azimuth=0°, the perpendicular angle Elevation=0°, and the radius r=1, and a position in a direction that is exactly in front of the user U11 placed in the reproduction space.

In this way, it is assumed that the object position information, the reference screen information, and the reproduction screen information are each described by the horizontal angle Azimuth and the perpendicular angle Elevation. In this case, when the remapping is performed on the basis of the object position information, the reference screen information, and the reproduction screen information, the located position of each object in the reproduction space is changed as indicated by, for example, arrows A13 and A14.

In this example, the object OBJ1 to the object OBJ6 are relocated in conformity with a reproduction screen PSC11 that is actually used for reproduction.

That is, the object OBJ1 and the object OBJ2 that are placed on the reference screen RSC11 are located on the reproduction screen PSC11 in the same positional relation as that on the reference screen RSC11.

It is noted that central positions of both the reference screen RSC11 and the reproduction screen PSC11 are identical to the reference position in this example.

Moreover, the objects are located in a relative positional relation that is substantially the same as that before remapping. The object OBJ1, the object OBJ3, and the object OBJ5 are located to be bilaterally symmetric with the object OBJ2, the object OBJ4, and the object OBJ6 in the horizontal direction when being viewed from the user U11.

According to such remapping, each object located in conformity with the reference screen RSC11 can be relocated at the position in conformity with the reproduction screen PSC11 actually used for reproduction. As a result, at the time of the content reproduction, it is possible to reproduce the content in such a manner, for example, that a sound of each object displayed on the reproduction screen PSC11 comes from a direction of the object. Further, as for the objects that are not displayed on the reproduction screen PSC11, the content can be reproduced in such a manner that a sound of each of the objects comes from an appropriate direction. It is thereby possible to realize appropriate audio reproduction.

The remapping performed by means of the ordinary Screen-Related Object Element Remapping technique will now be described in more detail while referring to the six objects depicted in FIG. 1 by way of example.

It is assumed, for example, that information depicted in FIG. 2 is given as the reference screen information of the reference screen RSC11, the object position information of the object OBJ1 to the object OBJ6, and the reproduction screen information of the reproduction screen PSC11.

In FIG. 2, the reference screen information and the object position information are depicted in a part indicated by an arrow Q11, and the reproduction screen information is depicted in a part indicated by an arrow Q12. In addition, in the views of the information, a numerical value of the horizontal angle Azimuth or the perpendicular angle Elevation is described in each of right-hand side fields.

In this example, the reference screen information is information that indicates the position and the magnitude of the reference screen RSC11, that is, positions of upper, lower, left, and right ends of the reference screen RSC11.

Specifically, in fields for the reference screen information, characters "Azimuth left end" and "Azimuth right end" indicate the positions of the left-hand side end and the right-hand side end of the reference screen RSC11 in FIG. 1, respectively, and "29.0" and "−29.0" are described as horizontal angles Azimuth that indicate those positions. The left-hand side end and the right-hand side end of the reference screen RSC11 in FIG. 1 are often referred to as "left end" and "right end" of the reference screen RSC11, hereinafter.

Furthermore, in the fields for the reference screen information, characters "Elevation upper end" and "Elevation lower end" indicate the positions of the upper side end and the lower side end of the reference screen RSC11 in FIG. 1, respectively, and "17.5" and "−17.5" are described as perpendicular angles Elevation that indicate those positions. The upper side end and the lower side end of the reference screen RSC11 in FIG. 1 are often referred to as "upper end" and "lower end" of the reference screen RSC11, hereinafter.

The object position information of each of the objects OBJ1 to OBJ6 is also depicted in the part indicated by the arrow Q11. Specifically, in respective fields for "OBJ1" to "OBJ6," the positions of the object OBJ1 to the object OBJ6 are described.

For example, in fields for the object OBJ1 which is denoted by a character "OBJ1," characters "Azimuth" and "Elevation" indicate horizontal and perpendicular positions of the object OBJ1, respectively, and "20.0" and "10.0" are described as the horizontal angle Azimuth and the perpendicular angle Elevation that indicate those positions.

Furthermore, the reproduction screen information is depicted in the part indicated by the arrow Q12.

In this example, the reproduction screen information is information that indicates the position and the magnitude of the reproduction screen PSC11, that is, positions of upper, lower, left, and right ends of the reproduction screen PSC11.

Specifically, in fields for the reproduction screen information, characters "Azimuth left end" and "Azimuth right end" indicate the positions of the left-hand side end and the right-hand side end of the reproduction screen PSC11 in FIG. 1, respectively, and "14.5" and "−14.5" are described as horizontal angles Azimuth that indicate those positions. The left-hand side end and the right-hand side end of the reproduction screen PSC11 in FIG. 1 are often referred to as "left end" and "right end" of the reproduction screen PSC11, hereinafter.

Furthermore, in the fields for the reproduction screen information, characters "Elevation upper end" and "Elevation lower end" indicate the positions of the upper side end and the lower side end of the reproduction screen PSC11 in FIG. 1, respectively, and "8.5" and "−8.5" are described as perpendicular angles Elevation that indicate those positions. The upper side end and the lower side end of the reproduction screen PSC11 in FIG. 1 are often referred to as "upper end" and "lower end" of the reproduction screen PSC11, hereinafter.

It is understood from the reproduction screen information indicated by the arrow Q12 that the reproduction screen PSC11 is a screen (display screen) having the magnitude substantially half of that of the reference screen RSC11.

When the reference screen information, the object position information, and the reproduction screen information described above are given, calculation is conducted as represented by the following Equations (1) and (2) to calculate the positions of the objects after remapping in the ordinary Screen-Related Object Element Remapping technique.

[Math. 1]

$$\phi' = \begin{cases} \dfrac{\phi_{right}^{repro} + 180°}{\phi_{right}^{nominal} + 180°} \cdot & \\ (\phi + 180°) - 180° & \text{for } -180° \leq \phi < \phi_{right}^{nominal} \\ \dfrac{\phi_{left}^{repro} - \phi_{right}^{repro}}{\phi_{left}^{nominal} - \phi_{right}^{nominal}} \cdot & \\ (\phi - \phi_{right}^{nominal}) + \phi_{right}^{repro} & \text{for } \phi_{right}^{nominal} \leq \phi < \phi_{left}^{nominal} \\ \dfrac{180° - \theta_{left}^{repro}}{180° - \phi_{left}^{nominal}} \cdot & \\ (\phi - \phi_{left}^{nominal}) + \phi_{left}^{repro} & \text{for } \phi_{left}^{nominal} \leq \phi < 180° \end{cases} \quad (1)$$

[Math. 2]

$$\theta' = \begin{cases} \dfrac{\theta_{bottom}^{repro} + 90°}{\theta_{bottom}^{nominal} + 90°} \cdot & \\ (\theta + 90°) - 90° & \text{for } -90° \leq \theta < \theta_{bottom}^{nominal} \\ \dfrac{\theta_{top}^{repro} - \theta_{bottom}^{repro}}{\theta_{top}^{nominal} - \theta_{bottom}^{nominal}} \cdot & \\ (\theta - \theta_{bottom}^{nominal}) + \theta_{bottom}^{repro} & \text{for } \theta_{bottom}^{nominal} \leq \theta < \theta_{top}^{nominal} \\ \dfrac{90° - \theta_{top}^{repro}}{90° - \theta_{top}^{nominal}} \cdot & \\ (\theta - \theta_{top}^{nominal}) + \theta_{top}^{repro} & \text{for } \theta_{top}^{nominal} \leq \theta < 90° \end{cases} \quad (2)$$

Note that, in Equation (1), φ indicates the horizontal position of each object before remapping, that is, the horizontal angle Azimuth included in the object position information, and φ' indicates the horizontal angle Azimuth that indicates the horizontal position of the object after remapping.

Furthermore, in Equation (1) $\varphi_{left}^{nominal}$ and $\varphi_{right}^{nominal}$ indicate the horizontal angles Azimuth that indicate the horizontal positions of the left end and the right end of the reference screen RSC11, and $\varphi_{left}^{repro}$ and $\varphi_{right}^{repro}$ indicate the horizontal angles Azimuth that indicate the horizontal positions of the left end and the right end of the reproduction screen PSC11.

In Equation (2), θ indicates the perpendicular position of each object before remapping, that is, the perpendicular angle Elevation included in the object position information, and θ' indicates the perpendicular angle Elevation that indicates the perpendicular position of the object after remapping.

Furthermore, in Equation (2), $\theta_{top}^{nominal}$ and $\theta_{bottom}^{nominal}$ indicate the perpendicular angles Elevation that indicate the perpendicular positions of the upper end and the lower end of the reference screen RSC11, and $\theta_{top}^{repro}$ and $\theta_{bottom}^{repro}$ indicate the perpendicular angles Elevation that indicate the perpendicular positions of the upper end and the lower end of the reproduction screen PSC11.

The horizontal angle Azimuth indicating the horizontal position of each object after remapping is calculated as represented by above Equation (1), and the perpendicular angle Elevation indicating the perpendicular position of the object after remapping is calculated as represented by above Equation (2).

In remapping by calculation represented by Equations (1) and (2), the objects within the reference screen RSC11 are subjected to remapping in such a manner that those objects just fall within the reproduction screen PSC11 while a positional relation between the objects remains unchanged. In addition, the objects outside of the reference screen RSC11 are subjected to remapping in response to a positional relation between the ends of the reference screen RSC11 and those of the reproduction screen PSC11.

In calculation represented by Equation (1), the horizontal position is remapped, for example, as depicted in FIG. 3. Note that, in FIG. 3, a horizontal axis denotes a horizontal angle φ of each object before remapping, and a vertical axis denotes a horizontal angle φ' of the object after remapping.

In this example, a position indicated by a horizontal angle $\varphi_{right}^{nominal}$ is remapped to a position indicated by a horizontal angle $\varphi_{right}^{repro}$. In addition, a position indicated by a horizontal angle $\varphi_{left}^{nominal}$ is remapped to a position indicated by a horizontal angle $\varphi_{left}^{repro}$, and positions between the position indicated by the horizontal angle $\varphi_{right}^{nominal}$ and the position indicated by the horizontal angle $\varphi_{left}^{nominal}$ are linearly remapped.

A position indicated by a horizontal angle φ=−180° remains unchanged as a position indicated by a horizontal angle φ'=−180° even after remapping, and positions between the position indicated by the horizontal angle φ=−180° and the position indicated by the horizontal angle $\varphi_{right}^{nominal}$ are linearly remapped.

Likewise, a position indicated by a horizontal angle φ=180° remains unchanged as a position indicated by a horizontal angle φ'=180° even after remapping, and positions between the position indicated by the horizontal angle $\varphi_{left}^{nominal}$ and the position indicated by the horizontal angle φ=180° are linearly remapped.

Therefore, when calculation represented by Equations (1) and (2) is conducted on the basis of the reference screen information, the object position information, and the reproduction screen information depicted in FIG. 2, positions depicted in FIG. 4 are obtained as positions of the objects after remapping. In other words, object position information depicted in FIG. 4 is obtained by remapping.

FIG. 4 depicts the object position information of the object OBJ1 to the object OBJ6 after remapping. Specifically, in respective fields for "OBJ1" to "OBJ6," the positions of the object OBJ1 to the object OBJ6 are described.

For example, in fields for the object OBJ1 which is denoted by the character "OBJ1," characters "Azimuth" and "Elevation" indicate horizontal and perpendicular positions of the object OBJ1 after remapping, respectively, and "10.0" and "4.9" are described as the horizontal angle Azimuth and the perpendicular angle Elevation that indicate those positions.

The horizontal angle Azimuth "10.0" and the perpendicular angle Elevation "4.9" of this object OBJ1 indicate the horizontal angle $\varphi'$ and the perpendicular angle $\theta'$ of the object OBJ1 after remapping, respectively.

As can be understood from the positions of the objects depicted in FIG. 4, even after remapping, the object OBJ1, the object OBJ3, and the object OBJ5 are located to be bilaterally symmetric with the object OBJ2, the object OBJ4, and the object OBJ6 in the horizontal direction when being viewed from the user U11. That is, it is understood that remapping has been performed appropriately.

Meanwhile, the ordinary Screen-Related Object Element Remapping technique is premised on the fact that the reference screen RSC11 is placed in front of the user U11, that is, the central position of the reference screen RSC11 is identical to the reference position. In other words, it is not supposed that the central position of the reference screen RSC11 is a position other than the reference position.

Owing to this, when the central position of the reference screen RSC11 is a position other than the reference position and remapping is performed as usual, the positional relation among the objects outside of the reference screen RSC11 is distorted.

Specifically, when remapping is performed by the calculation represented by Equations (1) and (2) while reference screen information, object position information, and reproduction screen information depicted in FIG. 5, for example, are given, object position information of the objects after remapping is that as depicted in FIG. 6. It is noted that FIGS. 5 and 6 correspond to FIGS. 2 and 4 and description of similar parts in FIGS. 5 and 6 to those in FIGS. 2 and 4 will be omitted as appropriate.

In FIG. 5, reference screen information of the reference screen RSC11 and object position information of the object OBJ1 to the object OBJ6 are depicted in a part indicated by an arrow Q21.

In this example, a position of the reference screen RSC11 indicated by the reference screen information is a position obtained by rotating the position depicted in the example of FIG. 2 by as much as 30° in the positive direction of the horizontal angle Azimuth. That is, in the example of FIG. 2, the central position of the reference screen RSC11 is identical to the reference position, whereas in the example depicted in FIG. 5, the central position of the reference screen RSC11 is a position indicated by a horizontal angle Azimuth=30° and a perpendicular angle Elevation=0°.

Likewise, in the example depicted in FIG. 5, a position of each object indicated by the object position information is a position obtained by rotating the position of the same object depicted in the example of FIG. 2 by as much as 30° in the positive direction of the horizontal angle Azimuth.

Therefore, a relative positional relation between the reference screen RSC11 and each object in the example depicted in FIG. 2 is the same as that in the example depicted in FIG. 5.

Furthermore, reproduction screen information is depicted in a part indicated by an arrow Q22, and this reproduction screen information is the same as the reproduction screen information depicted in FIG. 2.

While the object position information depicted in FIG. 6 is obtained by remapping based on the reference screen information, the object position information, and the reproduction screen information as described above, it is understood from this object position information that the positional relation among the objects are asymmetrical.

Note that, in FIG. 6, the positions of the object OBJ1 to the object OBJ6 are described in fields for "OBJ1" to "OBJ6," respectively.

Before remapping, the object OBJ1, the object OBJ3, and the object OBJ5 are located to be bilaterally symmetric with the object OBJ2, the object OBJ4, and the object OBJ6 with respect to a segment that connects the origin O to the central position of the reference screen RSC11 in the horizontal direction.

On the other hand, in the example depicted in FIG. 6, it is understood from the horizontal angles Azimuth that the object OBJ1 and the object OBJ2 located within the reference screen RSC11 are bilaterally symmetric with each other with respect to a segment that connects the origin O to the central position of the reproduction screen PSC11 in the horizontal direction even after remapping.

However, it is understood that the object OBJ3 and the object OBJ4 located outside of the reference screen RSC11 are not bilaterally symmetric with each other with respect to the segment that connects the origin O to the central position of the reproduction screen PSC11 in the horizontal direction, and the object OBJ5 and the object OBJ6 located outside of the reference screen RSC11 are not bilaterally symmetric with each other with respect to the segment in the horizontal direction. That is, it is understood that the positions of the objects after remapping are not appropriate positions and the positional relation among the objects is distorted.

Figure 7:
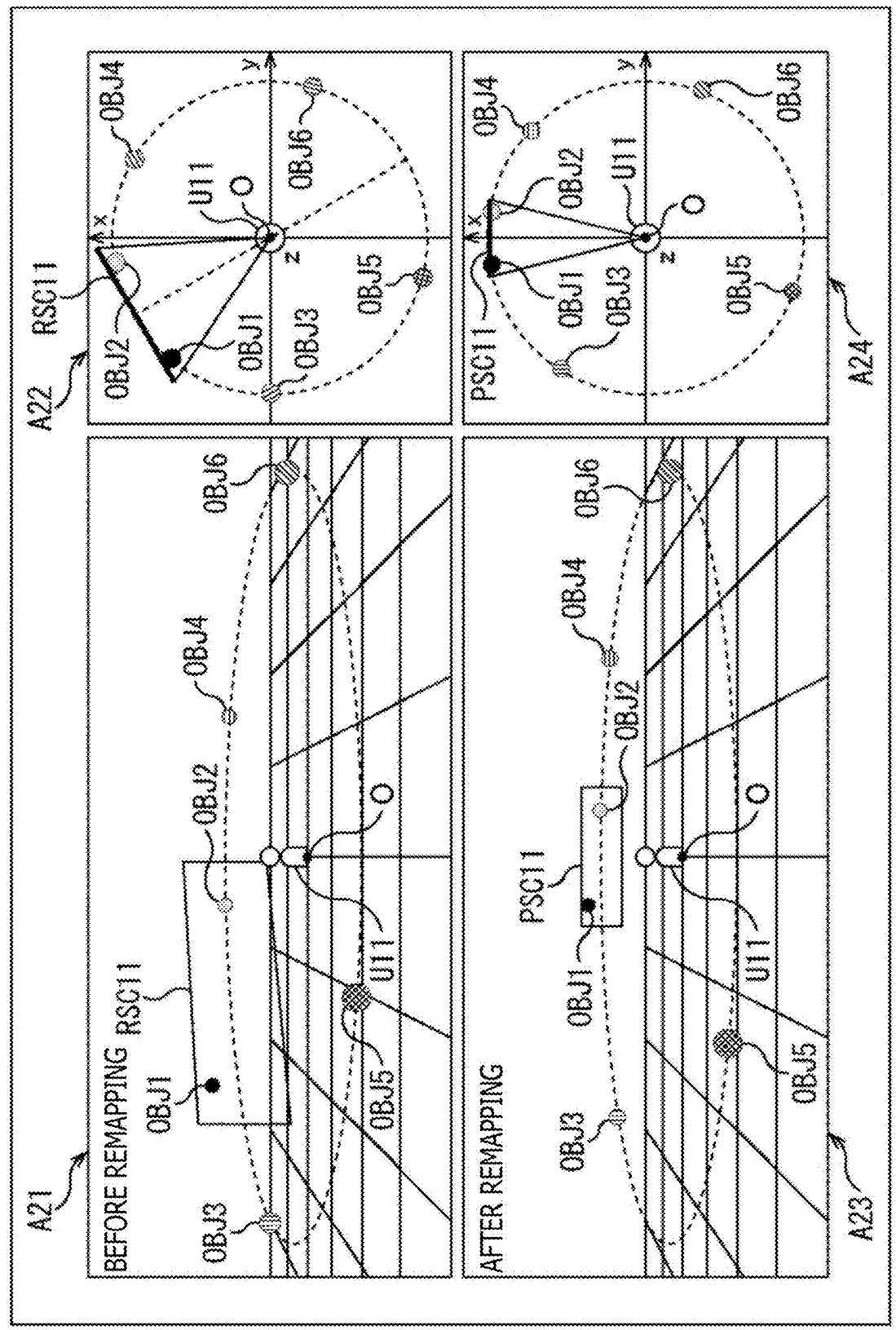
FIG. 7 depicts positional relations among objects before and after remapping.

A pattern diagram of the positional relations among the objects before remapping and after remapping in this example is that depicted in FIG. 7. It is noted that parts corresponding to those in FIG. 1 are denoted by the same reference symbols in FIG. 7 and description of the parts will be omitted as appropriate.

In FIG. 7, the reference screen RSC11 and the object OBJ1 to the object OBJ6 before remapping are depicted in parts indicated by arrows A21 and A22. On the other hand, the reproduction screen PSC11 and the object OBJ1 to the object OBJ6 after remapping are depicted in parts indicated by arrows A23 and A24.

In remapping, it is expected that the objects are subjected to remapping in such a manner that the positional relation among the objects viewed from the reproduction screen PSC11 is substantially the same as the positional relation among the objects viewed from the reference screen RSC11 before remapping.

In this example, the relative positional relation among the object OBJ1 to the object OBJ6 before remapping is the same as that in the example depicted in FIG. 1, and a position of the reproduction screen PSC11 is also the same as that in the example depicted in FIG. 1. It is, therefore, expected that the object OBJ1 to the object OBJ6 after remapping are relocated at the same positions as those of the objects depicted in FIG. 1.

However, as is understood from FIG. 7, as for the relative positional relation among the object OBJ3 to the object OBJ6 placed outside of the reference screen RSC11 before remapping, the relative positional relation greatly changes between before remapping and after remapping. The object positions of the object OBJ5 and the object OBJ6, in particular, are greatly misaligned.

Owing to this, when audio signals of the objects are subjected to rendering on the basis of the object position information obtained by remapping, audio images of the objects outside of the reproduction screen PSC11 are localized at positions different from those at which the objects are originally supposed to be present at the time of sound reproduction.

To address the problem, therefore, the present technique intends to be able to perform appropriate remapping even if the central position of the reference screen RSC11 differs from the reference position by appropriately correcting the object position information and the reference screen information.

Example of Configuration of Information Processing Apparatus

Figure 8:
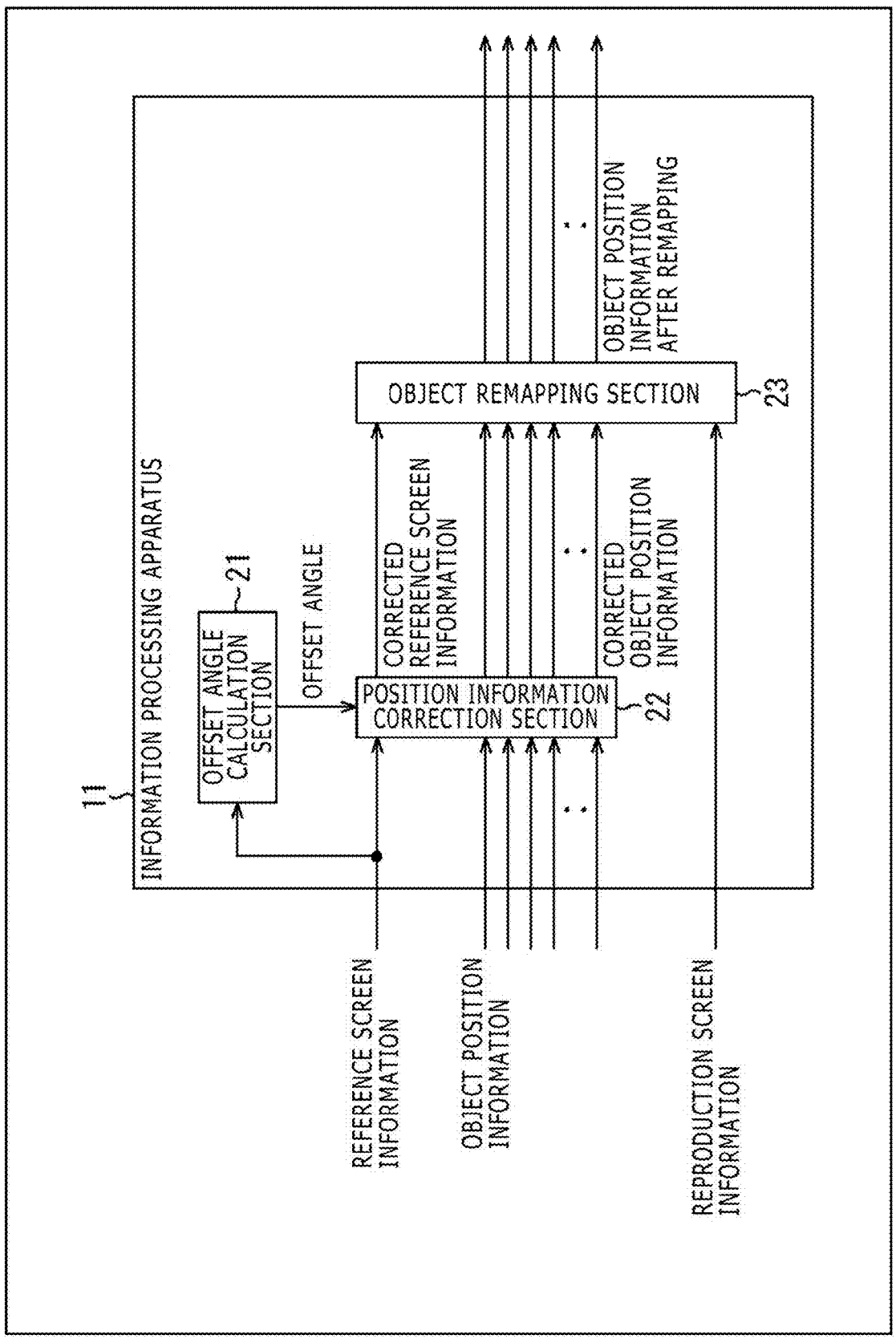
FIG. 8 depicts an example of a configuration of an information processing apparatus.

FIG. 8 depicts an example of a configuration of one embodiment of an information processing apparatus to which the present technique is applied.

An information processing apparatus 11 depicted in FIG. 8 includes an offset angle calculation section 21, a position information correction section 22, and an object remapping section 23.

The reference screen information, the object position information of each object, and the reproduction screen information are supplied to this information processing apparatus 11 from outside.

It is assumed herein that the reference screen information includes, for example, the horizontal angles that indicate the positions of the left end and the right end of the reference screen RSC11 and the perpendicular angles that indicate the positions of the upper end and the lower end of the reference screen RSC11. The reference screen information is information that indicates the position and the magnitude of the reference screen RSC11 while the reference position present in the front direction of the user U11 is used as the reference.

Likewise, it is assumed that the reproduction screen information includes the horizontal angles that indicate the positions of the left end and the right end of the reproduction screen PSC11 and the perpendicular angles that indicate the positions of the upper end and the lower end of the reproduction screen PSC11. This reproduction screen information is, similarly, information that indicates the position and the magnitude of the reproduction screen PSC11 while the reference position is used as the reference.

Furthermore, the object position information of each object is assumed to include the horizontal angle and the perpendicular angle that indicate the position of the object. The object position information is information that indicates the position of each object while the reference position present in the front direction of the user U11 is used as the reference.

The offset angle calculation section 21 calculates a horizontal angle formed between the front direction of the user U11 present in the reproduction space, that is, the direction from the origin O to the reference position and a direction from the origin O to the central position of the reference screen RSC11 as an offset angle on the basis of the supplied reference screen information, and supplies the offset angle to the position information correction section 22.

The offset angle of the reference screen RSC11 is a horizontal angle Azimuth that indicates a misalignment amount of the central position of the reference screen RSC11 from the reference position in a direction of the horizontal angle Azimuth. That is, the offset angle is information that indicates an offset amount of the reference screen RSC11 from the reference position present in the front direction of the user U11. Note that, while the offset angle that is the horizontal angle is described herein as an example of the information indicating the offset amount, the information indicating the offset amount may be any other information.

The position information correction section 22 corrects the reference screen information and the object position information supplied from outside on the basis of the offset angle supplied from the offset angle calculation section 21, and supplies resultant corrected reference screen information and corrected object position information to the object remapping section 23.

The object remapping section 23 performs remapping of the object position information, that is, each object position on the basis of the reproduction screen information supplied from outside and the corrected reference screen information and the corrected object position information supplied from the position information correction section 22, and outputs resultant object position information.

Processes by Each Section

Processes by the sections that constitute the information processing apparatus 11 will now be described more specifically.

First, the offset angle calculation section 21 calculates an offset angle $\varphi_{offset\_value}$ by conducting calculation represented by, for example, the following Equation (3) on the basis of the supplied reference screen information.

[Math. 3]

$$\phi_{offset\_value} = \frac{\phi_{left}^{nominal} + \phi_{right}^{nominal}}{2} \quad (3)$$

Note that, in Equation (3), $\varphi_{left}^{nominal}$ and $\varphi_{right}^{nominal}$ indicate the horizontal angles Azimuth that indicate the positions of the left end and the right end of the reference screen RSC11. The information $\varphi_{left}^{nominal}$ and $\varphi_{right}^{nominal}$ is included in the reference screen information.

Furthermore, the position information correction section 22 corrects the reference screen information on the basis of the offset angle $\varphi_{offset\_value}$ in such a manner that the central position of the reference screen RSC11 becomes identical to the reference position. That is, the position information correction section 22 calculates the corrected reference screen information by calculation represented by the following Equations (4) and (5).

[Math. 4]

$$\phi_{offset\_left}^{nominal} = \phi_{left}^{nominal} - \phi_{offset\_value} \quad (4)$$

[Math. 5]

$$\phi_{offset\_right}^{nominal} = \phi_{right}^{nominal} - \phi_{offset\_value} \quad (5)$$

Note that, in Equation (4), $\varphi_{left}^{nominal}$ indicates the horizontal angle Azimuth that indicates the position of the left end of the reference screen RSC11, and $\varphi_{offset\_left}^{nominal}$ indicates a horizontal angle Azimuth after correcting the horizontal angle $\varphi_{left}^{nominal}$ using the offset angle $\varphi_{offset\_value}$.

That is, $\varphi_{offset\_left}^{nominal}$ indicates the horizontal angle Azimuth that indicates the position of the left end of the corrected reference screen RSC11.

Moreover, in Equation (5), $\varphi_{right}^{nominal}$ indicates the horizontal angle Azimuth that indicates the position of the right end of the reference screen RSC11, and $\varphi_{offset\_right}^{nominal}$ indicates a horizontal angle Azimuth after correcting the horizontal angle $\varphi_{right}^{nominal}$ using the offset angle $\varphi_{offset\_value}$.

That is, $\varphi_{offset\_right}^{nominal}$ indicates the horizontal angle Azimuth that indicates the position of the right end of the corrected reference screen RSC11.

Therefore, the horizontal angle $\varphi_{left}^{nominal}$ included in the reference screen information is corrected by calculation represented by Equation (4), and the horizontal angle $\varphi_{right}^{nominal}$ included in the reference screen information is corrected by calculation represented by Equation (5).

At a time of correcting the reference screen information, only the horizontal angles $\varphi_{left}^{nominal}$ and $\varphi_{right}^{nominal}$ are corrected while the perpendicular angles that indicate the positions of the upper end and the lower end of the reference screen RSC11 are not corrected.

Such a process for calculating the corrected reference screen information is a process for rotating the reference screen RSC11 by as much as the offset angle $\varphi_{offset\_value}$, that is, by as much as a misalignment of the central position of the reference screen RSC11 from the reference position. Through this process, the reference screen information is corrected in such a manner that the central position of the reference screen RSC11 becomes identical to the reference position.

Furthermore, the position information correction section 22 corrects the object position information on the basis of the offset angle $\varphi_{offset\_value}$ in such a manner that the positions of the objects are corrected (moved) in conformity with correction (movement) of the position of the reference screen RSC11, that is, correction of the reference screen information. That is, the position information correction section 22 calculates the corrected object position information by calculation represented by the following Equation (6).

[Math. 6]

$$\varphi_{offset} = \varphi - \varphi_{offset\_value} \tag{6}$$

Note that, in Equation (6), $\varphi$ indicates the horizontal angle Azimuth of each object included in the object position information, and $\varphi_{offset}$ indicates a horizontal angle Azimuth obtained by correcting the horizontal angle $\varphi$ using the offset angle $\varphi_{offset\_value}$. That is, $\varphi_{offset}$ indicates the horizontal angle Azimuth that indicates the corrected object position.

Therefore, the horizontal angle $\varphi$ included in the object position information is corrected by calculation represented by Equation (6). At a time of correcting the object position information, only the horizontal angle $\varphi$ is corrected while the perpendicular angle that indicates the perpendicular position of the object is not corrected.

Such a process for calculating the corrected object position information is a process for rotating the position of each object by as much as the offset angle $\varphi_{offset\_value}$.

Through this process, the position of each object is corrected in conformity with the position of the reference screen RSC11. More specifically, the position of each object is corrected in conformity with correction of the central position of the reference screen RSC11. Owing to this, the relative position of each object to the reference screen RSC11 has no change between before and after the correction of the reference screen information and the object position information.

When the corrected reference screen information and the corrected object position information are obtained as described so far, the object remapping section 23 performs remapping. That is, the position of each object is remapped in conformity with the position of the reproduction screen PSC11.

At this time, the corrected reference screen information and the corrected object position information that indicate the positional relation between the reference screen RSC11 and the objects serve as information that indicates a positional relation when the reference position is set identical to the central position of the reference screen RCS11.

Therefore, using the corrected reference screen information and the corrected object position information can prevent distortions of the object positions even if the object positions are remapped by similar calculation to that conducted in the ordinary Screen-Related Object Element Remapping technique. That is, it is possible to realize appropriate remapping.

Specifically, the object remapping section 23 calculates the object position information after remapping by conducting calculation represented by the following Equation (7) on the basis of the corrected reference screen information, the reproduction screen information, and the corrected object position information.

[Math. 7]

$$\phi' = \begin{cases} \dfrac{\phi_{right}^{repro} + 180°}{\phi_{offset\_right}^{nominal} + 180°} \cdot & \text{for } -180° \leq \phi_{offset} < \phi_{offset\_right}^{nominal} \\ (\phi_{offset} + 180°) - 180° & \\ \dfrac{\phi_{left}^{repro} - \phi_{right}^{repro}}{\phi_{offset\_left}^{nominal} - \phi_{offset\_right}^{nominal}} \cdot & \text{for } \phi_{offset\_right}^{nominal} \leq \phi_{offset} < \phi_{offset\_left}^{nominal} \\ (\phi_{offset} - \phi_{offset\_right}^{nominal}) + \phi_{right}^{repro} & \\ \dfrac{180° - \theta_{left}^{repro}}{180° - \theta_{offset\_left}^{nominal}} \cdot & \text{for } \phi_{offset\_left}^{nominal} \leq \phi_{offset} < 180° \\ (\phi_{offset} - \phi_{offset\_left}^{nominal}) + \phi_{left}^{repro} & \end{cases} \tag{7}$$

Note that, in Equation (7), $\varphi'$ indicates the horizontal angle Azimuth that indicates the horizontal position of each object after remapping, and $\varphi_{offset}$ indicates the horizontal position of the object before remapping, that is, the horizontal angle Azimuth included in the corrected object position information.

Furthermore, in Equation (7) $\varphi_{offset\_left}^{nominal}$ and $\varphi_{offset\_right}^{nominal}$ indicate the horizontal angles Azimuth that indicate the corrected horizontal positions of a left end and a right end of the reference screen RSC11. That is, $\varphi_{offset\_left}^{nominal}$ and $\varphi_{offset\_right}^{nominal}$ indicate the horizontal angles Azimuth of the left end and the right end of the reference screen RSC11 included in the corrected reference screen information.

Moreover, in Equation and $\varphi_{left}^{repro}$ and $\varphi_{right}^{repro}$ indicate the horizontal angles Azimuth that indicate the horizontal positions of the left end and the right end of the reproduction screen PSC11.

Further, more specifically, in determining the remapped object position information of each object, the object remapping section 23 conducts calculation represented by Equation (2) described above on the basis of the corrected reference screen information, the reproduction screen information, and the corrected object position information. The perpendicular angle θ' that indicates the remapped perpendicular position of the object included in the object position information after remapping is thereby obtained.

By performing the processes described above, the information processing apparatus 11 can perform appropriate remapping.

Specifically, when the information processing apparatus 11 performs remapping while the reference screen information, the object position information, and the reproduction screen information depicted in, for example, FIG. 5 are given, object position information depicted in FIG. 9 is obtained as the object position information after remapping.

Note that, in FIG. 9, in respective fields for "OBJ1" to "OBJ6," the remapped object position information of the object OBJ1 to the object OBJ6, that is, horizontal angles Azimuth and perpendicular angles Elevation of positions of the objects after remapping are depicted.

For example, in fields for the object OBJ1 which is denoted by the character "OBJ1," characters "Azimuth" and "Elevation" indicate horizontal and perpendicular positions of the object OBJ1 after remapping, respectively, and "10.0" and "4.9" are described as the horizontal angle Azimuth and the perpendicular angle Elevation that indicate those positions. The horizontal angle Azimuth "10.0" and the perpendicular angle Elevation "4.9" are the horizontal angle φ' calculated as represented by Equation (7) and the perpendicular angle θ' calculated as represented by Equation (2), respectively.

In the example depicted in FIG. 9, the relative positional relation among all the objects OBJ1 to OBJ6 before remapping is substantially the same as that after remapping.

That is, it is understood that the object OBJ1 and the object OBJ2 located within the reference screen RSC11 are bilaterally symmetric with each other with respect to a segment that connects the origin O to a central position of the reproduction screen PSC11 in the horizontal direction even after remapping.

Moreover, it is understood that the object OBJ3 and the object OBJ4 located outside of the reference screen RSC11 are bilaterally symmetric with each other with respect to the segment that connects the origin O to the central position of the reproduction screen PSC11 in the horizontal direction, and the object OBJ5 and the object OBJ6 located outside of the reference screen RSC11 are bilaterally symmetric with each other with respect to the segment in the horizontal direction. That is, it is understood that the positions of all the objects after remapping are appropriate positions.

Figure 10:
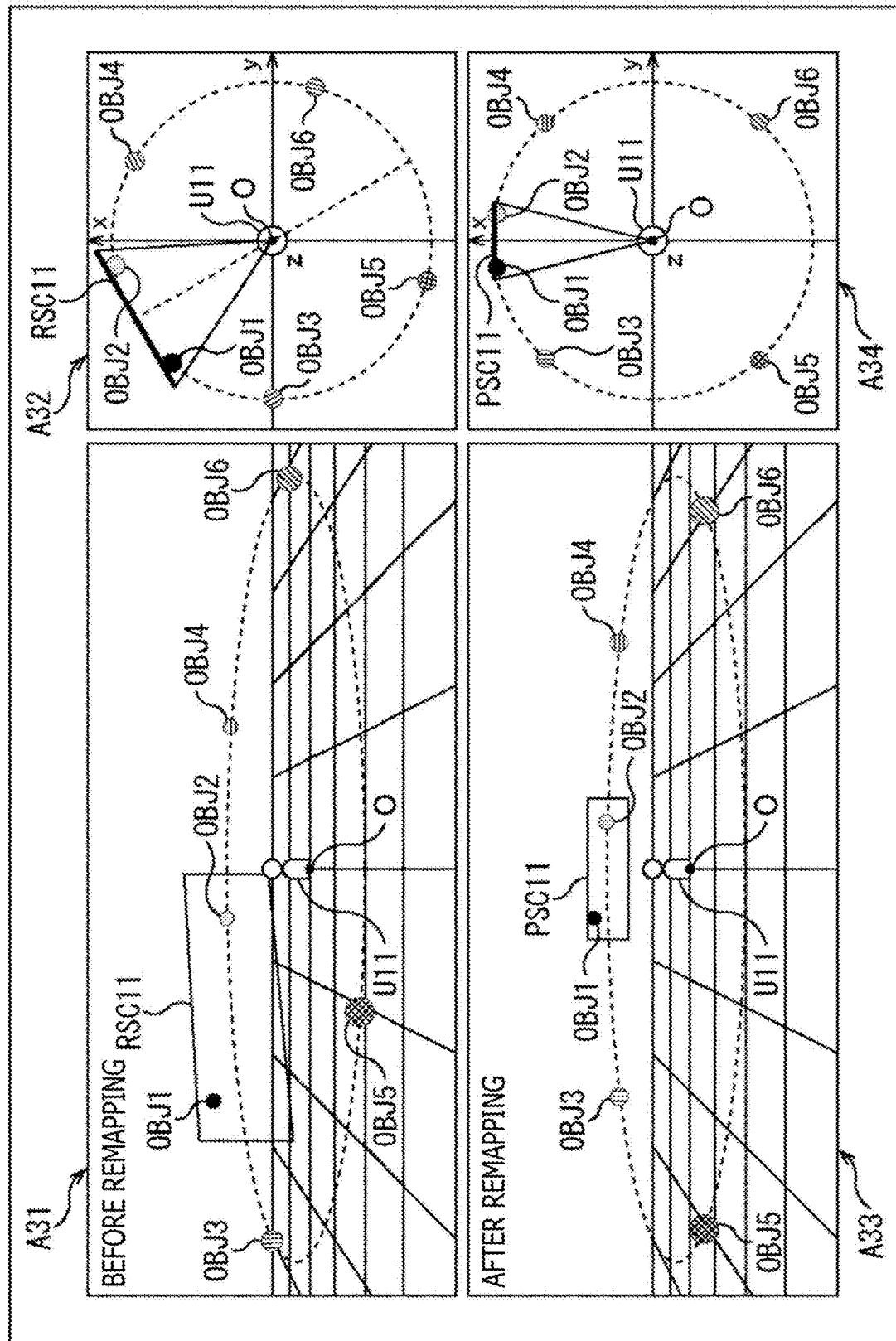
FIG. 10 depicts positional relations among objects before and after remapping.

A pattern diagram of the positional relations among the objects before remapping and after remapping in this example is that depicted in FIG. 10. It is noted that parts corresponding to those in FIG. 1 are denoted by the same reference symbols in FIG. 10 and description of the parts will be omitted as appropriate.

In FIG. 10, the reference screen RSC11 and the object OBJ1 to the object OBJ6 before remapping are depicted in parts indicated by arrows A31 and A32. More specifically, the reference screen RSC11 is located at the position indicated by the uncorrected reference screen information, and the object OBJ1 to the object OBJ6 are located at the positions indicated by the uncorrected object position information.

On the other hand, the reproduction screen PSC11 and the object OBJ1 to the object OBJ6 after remapping are depicted in parts indicated by arrows A33 and A34.

In this example, the reference screen RSC11 and the object OBJ1 to the object OBJ6 before remapping indicated by the arrows A31 and A32 are located at the same positions as those in the example depicted in FIG. 7.

Moreover, it is understood that in the parts indicated by the arrows A33 and A34, the object OBJ1, the object OBJ3, and the object OBJ5 after remapping are bilaterally symmetric with the object OBJ2, the object OBJ4, and the object OBJ6 after remapping with respect to the segment that connects the origin O to the central position of the reproduction screen PSC11 in the horizontal direction. That is, it is understood that the positional relation among the objects viewed from the central position of the screen before remapping is substantially the same as that after remapping, and remapping has been performed appropriately.

Description of Remapping Process

A remapping process performed by the information processing apparatus 11 will next be described with reference to the flowchart of FIG. 11.

In Step S11, the offset angle calculation section 21 calculates the offset angle $\varphi_{offset\_value}$ on the basis of the supplied reference screen information, and supplies the offset angle $\varphi_{offset\_value}$ to the position information correction section 22.

Specifically, the offset angle calculation section 21 calculates the offset angle $\varphi_{offset\_value}$ by conducting calculation represented by Equation (3).

In Step S12, the position information correction section 22 corrects the reference screen information and the object position information supplied from outside on the basis of the offset angle $\varphi_{offset\_value}$ supplied from the offset angle calculation section 21.

For example, the position information correction section 22 corrects the reference screen information by conducting calculation represented by Equations (4) and (5) from the offset angle $\varphi_{offset\_value}$ and the reference screen information, and supplies the resultant corrected reference screen information to the object remapping section 23.

Furthermore, the position information correction section 22 corrects the object position information by conducting calculation represented by Equation (6) from the offset angle $_{offset\_value}$ and the object position information, and supplies the resultant corrected object position information to the object remapping section 23.

In Step S13, the object remapping section 23 performs remapping of each object position on the basis of the reproduction screen information supplied from outside, and the corrected reference screen information and the corrected object position information supplied from the position information correction section 22.

For example, the object remapping section 23 calculates the object position information that indicates the remapped positions of the objects by conducting calculation represented by Equations (2) and (7) on the basis of the corrected reference screen information, the reproduction screen information, and the corrected object position information. The object remapping section 23 then outputs the object position information obtained as described above to a subsequent stage, and the remapping process is ended.

In this way, the information processing apparatus 11 performs remapping after correcting the reference screen information and the object position information. By doing so, it is possible to perform appropriate remapping without dependence on the located position of the reference screen RSC11.

First Modification of First Embodiment

Remapping

Meanwhile, as specified in ISO/IEC 23008-3 "3D Audio" standard, a range of each of the horizontal angle $\varphi_{left}^{nominal}$ of the left end and the horizontal angle $\varphi_{right}^{nominal}$ of the right end of the reference screen RSC11 and the horizontal angle $\varphi$ of each object is often specified to be equal to or greater than −180° and equal to or smaller than 180°.

In such a case, it is necessary to appropriately correct the horizontal angles so that the horizontal angles are values within a preset range, that is, values equal to or greater than −180° and equal to or smaller than 180° at a time of calculating the corrected reference screen information and the corrected object position information.

Furthermore, when the range of each of the horizontal angles $\varphi_{left}^{nominal}$, $\varphi_{right}^{nominal}$, and $\varphi$ is specified to be equal to or greater than −180° and equal to or smaller than 180° and the reference screen RSC11 is located in a backward direction of the user U11, that is, located in the negative direction of the x-axis when being viewed from the user U11, the horizontal angles $\varphi_{left}^{nominal}$ and $\varphi_{right}^{nominal}$ often satisfy $\varphi_{left}^{nominal} < \varphi_{right}^{nominal}$. In such a case, it is necessary to appropriately correct the offset angle $\varphi_{offset\_value}$ by an appropriate correction value at a time of calculating the offset value $\varphi_{offset\_value}$.

Note that it is assumed hereafter that the horizontal angles $\varphi_{left}^{nominal}$ and $\varphi_{right}^{nominal}$ are in a state of satisfying $\varphi_{left}^{nominal} < \varphi_{right}^{nominal}$ unless specified otherwise when the reference screen RSC11 is placed in the backward direction of the user U11.

When the range of each of the horizontal angles $\varphi_{left}^{nominal}$, $\varphi_{right}^{nominal}$, and $\varphi$ is specified to fall within the range equal to or greater than −180° and equal to or smaller than 180° in advance, remapping may be performed as follows.

Note that description will be continued hereinafter while specifically referring to a case in which reference screen information, object position information, and reproduction screen information depicted in FIG. 12 are given by way of example. In addition, FIG. 12 corresponds to FIG. 2 and description of similar parts in FIG. 12 to those in FIG. 2 will be omitted as appropriate.

In FIG. 12, the reference screen information of the reference screen RSC11 and the object position information of the object OBJ1 to the object OBJ6 are depicted in a part indicated by an arrow Q31.

In this example, a position of the reference screen RSC11 indicated by the reference screen information is a position obtained by rotating the position depicted in the example of FIG. 2 by as much as 180° in the direction of the horizontal angle Azimuth. That is, in the example of FIG. 2, the central position of the reference screen RSC11 is identical to the reference position, whereas in the example depicted in FIG. 12, the central position of the reference screen RSC11 is a position indicated by a horizontal angle Azimuth=180° and a perpendicular angle Elevation=0°.

Likewise, in the example depicted in FIG. 12, a position of each object indicated by the object position information is a position obtained by rotating the position of the same object depicted in the example of FIG. 2 by as much as 180° in the direction of the horizontal angle Azimuth.

Therefore, a relative positional relation between the reference screen RSC11 and each object in the example depicted in FIG. 2 is the same as that in the example depicted in FIG. 12.

Furthermore, the reproduction screen information is depicted in a part indicated by an arrow Q32, and this reproduction screen information is the same as the reproduction screen information depicted in FIG. 2.

When the reference screen information, the object position information, and the reproduction screen information described above are given, the offset angle calculation section 21 may calculate the offset angle $\varphi_{offset\_value}$ as represented by the following Equation (8) in place of Equation (3) described above.

[Math. 8]

$$\phi_{offset\_value} = \begin{cases} \dfrac{\phi_{left}^{nominal} + \phi_{right}^{nominal}}{2} & \text{for } \phi_{right}^{nominal} \leq \phi_{left}^{nominal} \\ \dfrac{360° + \phi_{left}^{nominal} + \phi_{right}^{nominal}}{2} & \text{for } \phi_{left}^{nominal} < \phi_{right}^{nominal} \end{cases} \quad (8)$$

Note that, in Equation (8), $\varphi_{left}^{nominal}$ and $\varphi_{right}^{nominal}$ indicate the horizontal angles Azimuth that indicate the positions of the left end and the right end of the reference screen RSC11.

In Equation (8), when the horizontal angles $\varphi_{left}^{nominal}$ and $\varphi_{right}^{nominal}$ satisfy $\varphi_{left}^{nominal} < \varphi_{right}^{nominal}$, that is, the reference screen RSC11 is present in the backward direction, 180° is added to the angle determined by Equation (3) as a correction value to obtain a final offset angle $\varphi_{offset\_value}$.

The reason is as follows. When the reference screen RSC11 is present in the backward direction and the offset angle $\varphi_{offset\_value}$ is calculated as represented by Equation (3), the same angle as that when the reference screen RSC11 is present in the front direction is obtained as the offset angle $\varphi_{offset\_value}$. Owing to this, it is necessary to add 180° as the correction value to accurately correct the offset angle.

Furthermore, in Equation (8), when the horizontal angles $\varphi_{left}^{nominal}$ and $\varphi_{right}^{nominal}$ do not satisfy $\varphi_{left}^{nominal} < \varphi_{right}^{nominal}$, that is, the reference screen RSC11 is not present in the backward direction, the offset angle $\varphi_{offset\_value}$ is calculated in the similar manner to that represented by Equation (3) described above.

When the offset angle $\varphi_{offset\_value}$ is calculated as represented by Equation (8), the position information correction section 22 may calculate the corrected reference screen information as represented by the following Equations (9) and (10) in place of Equations (4) and (5). Likewise, the position information correction section 22 may calculate the corrected object position information as represented by Equation (11) in place of Equation (6).

[Math. 9]

$$\phi_{offset\_left}^{nominal} = \qquad (9)$$

$$\begin{cases} \phi_{left}^{nominal} - \phi_{offset\_value} + 360° & \text{for } \phi_{left}^{nominal} < (\phi_{offset\_value} - 180°) \\ \phi_{left}^{nominal} - \phi_{offset\_value} & \text{for } (\phi_{offset\_value} - 180°) \leq \phi_{left}^{nominal} \leq (\phi_{offset\_value} + 180°) \\ \phi_{left}^{nominal} - \phi_{offset\_value} - 360° & \text{for } (180° + \phi_{offset\_value}) < \phi_{left}^{nominal} \end{cases}$$

-continued

[Math. 10]

$$\phi_{offset\_right}^{nominal} = \begin{cases} \phi_{right}^{nominal} - \phi_{offset\_value} + 360° & \text{for } \phi_{right}^{nominal} < (\phi_{offset\_value} - 180°) \\ \phi_{right}^{nominal} - \phi_{offset\_value} & \text{for } (\phi_{offset\_value} - 180°) \le \phi_{right}^{nominal} \le (\phi_{offset\_value} + 180°) \\ \phi_{right}^{nominal} - \phi_{offset\_value} - 360° & \text{for } (180° + \phi_{offset\_value}) < \phi_{right}^{nominal} \end{cases} \quad (10)$$

[Math. 11]

$$\phi_{offset} = \begin{cases} \phi - \phi_{offset\_value} + 360° & \text{for } \phi < (\phi_{offset\_value} - 180°) \\ \phi - \phi_{offset\_value} & \text{for } (\phi_{offset\_value} - 180°) \le \phi \le (\phi_{offset\_value} + 180°) \\ \phi - \phi_{offset\_value} - 360° & \text{for } (180° + \phi_{offset\_value}) < \phi \end{cases} \quad (11)$$

Note that, in Equations (9) to (11), $\varphi_{offset\_value}$ indicates the offset angle $\varphi_{offset\_value}$. Furthermore, in Equation (9), $\varphi_{left}^{nominal}$ indicates the horizontal angle Azimuth that indicates the position of the left end of the reference screen RSC11, and $\varphi_{offset\_left}^{nominal}$ indicates a horizontal angle Azimuth after correcting the horizontal angle $\varphi_{left}^{nominal}$ using the offset angle $\varphi_{offset\_value}$.

In Equation (10), $\varphi_{right}^{nominal}$ indicates the horizontal angle Azimuth that indicates the position of the right end of the reference screen RSC11, and $\varphi_{offset\_right}^{nominal}$ indicates a horizontal angle Azimuth after correcting the horizontal angle $\varphi_{right}^{nominal}$ using the offset angle $\varphi_{offset\_value}$.

Moreover, in Equation (11), $\varphi$ indicates the horizontal angle Azimuth that indicates the horizontal position of each object included in the object position information, and $\varphi_{offset}$ indicates a horizontal angle Azimuth obtained after correcting the horizontal angle $\varphi$ using the offset angle $\varphi_{offset\_value}$.

For example, in Equation (9), when $\varphi_{left}^{nominal} < \varphi_{offset\_value} - 180°$, that is, when $\varphi_{left}^{nominal} - \varphi_{offset\_value} < -180°$, 360° is added to the horizontal angle determined by Equation (4) described above to obtain the final horizontal angle $\varphi_{offset\_left}^{nominal}$.

In such a situation, when the horizontal angle $\varphi_{offset\_left}^{nominal}$ is obtained as represented by Equation (4), a value of the horizontal angle $\varphi_{offset\_left}^{nominal}$ that is originally supposed to be equal to or greater than −180° and equal to or smaller than 108° becomes smaller than −180°. To address the problem, in calculation represented by Equation (9), when $\varphi_{left}^{nominal} < \varphi_{offset\_value} - 180°$, 360° is added to the horizontal angle obtained as represented by Equation (4) as the correction value to accurately correct the horizontal angle $\varphi_{offset\_left}^{nominal}$.

Furthermore, in Equation (9), when $\varphi_{offset\_value} - 180° \le \varphi_{left}^{nominal} \le \varphi_{offset\_value} + 180°$, that is, when $-180° \le \varphi_{left}^{nominal} - \varphi_{offset\_value} \le 180°$, calculation is conducted in a similar manner as that represented by Equation (4). Moreover, in Equation (9), when $\varphi_{offset\_value} + 180°$ value $< \varphi_{left}^{nominal}$, that is, when $\varphi_{left}^{nominal} - \varphi_{offset\_value} > 180°$, the value of the horizontal angle $\varphi_{offset\_left}^{nominal}$ becomes greater than 180°. Owing to this, similarly to the case of $\varphi_{left}^{nominal} < \varphi_{offset\_value} - 180°$, −360° is added as the correction value to accurately correct the horizontal angle $\varphi_{offset\_left}^{nominal}$.

Furthermore, in not only Equation (9) but Equation (10) or (11), the correction is performed as needed similarly to the case of Equation (9).

In this way, to add 360° or −360° as the correction value depending on the corrected horizontal angle using the offset angle $\varphi_{offset\_value}$ for each piece of information such as $\varphi_{left}^{nominal} - \varphi_{offset\_value}$, that is, as needed at a time of correcting the reference screen information and the object position information can be restated as a process for adjusting the correction value used during correction of the reference screen RSC11 or each object position.

When the corrected reference screen information and the corrected object position information are calculated as described above, the object remapping section 23 calculates object position information after remapping as represented by Equations (2) and (7).

For example, when remapping described above is performed while the reference screen information, the object position information, and the reproduction screen information depicted in, for example, FIG. 12 are given, object position information depicted in FIG. 13 is obtained as the object position information after remapping.

Note that, in FIG. 13, in respective fields for "OBJ1" to "OBJ6," the remapped object position information of the object OBJ1 to the object OBJ6, that is, horizontal angles Azimuth and perpendicular angles Elevation of positions of the objects after remapping are depicted.

For example, in fields for the object OBJ1 which is denoted by the character "OBJ1," characters "Azimuth" and "Elevation" indicate horizontal and perpendicular positions of the object OBJ1 after remapping, respectively, and "10.0" and "4.9" are described as the horizontal angle Azimuth and the perpendicular angle Elevation that indicate those positions. The horizontal angle Azimuth "10.0" and the perpendicular angle Elevation "4.9" are the horizontal angle φ' calculated as represented by Equation (7) and the perpendicular angle θ' calculated as represented by Equation (2), respectively.

In the example depicted in FIG. 13, the relative positional relation among all the objects OBJ1 to OBJ6 before remapping is substantially the same as that after remapping.

That is, it is understood that the object OBJ1 and the object OBJ2, the object OBJ3 and the object OBJ4, and the object OBJ5 and the object OBJ6 are bilaterally symmetric with each other with respect to the segment that connects the origin O to the central position of the reproduction screen PSC11 in the horizontal direction even after remapping.

Figure 14:
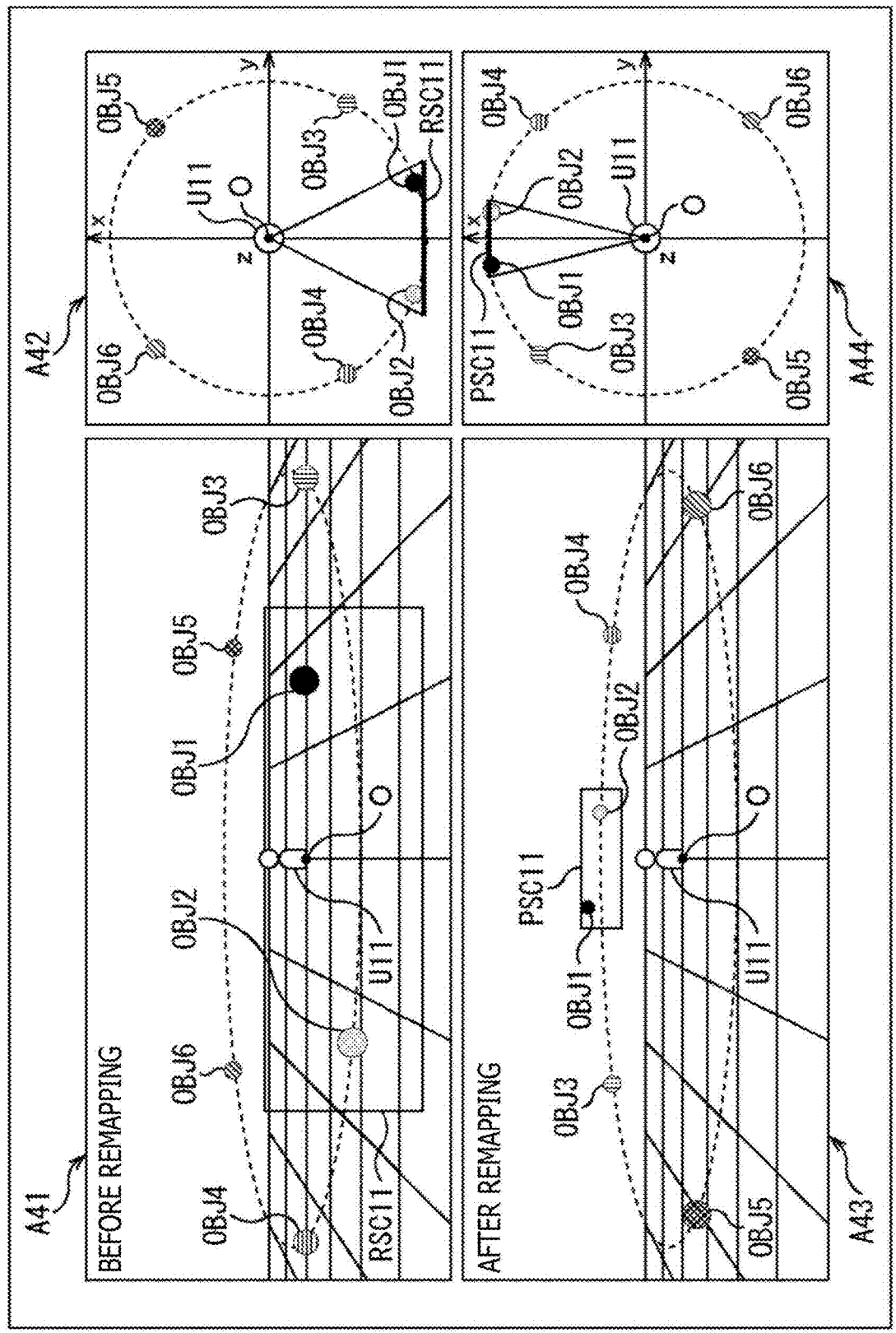
FIG. 14 depicts positional relations among objects before and after remapping.

A pattern diagram of the positional relations among the objects before remapping and after remapping in this example is that depicted in FIG. 14. It is noted that parts corresponding to those in FIG. 1 are denoted by the same reference symbols in FIG. 14 and description of the parts will be omitted as appropriate.

In FIG. 14, the reference screen RSC11 and the object OBJ1 to the object OBJ6 before remapping are depicted in parts indicated by arrows A41 and A42. More specifically, the reference screen RSC11 is located at the position indicated by the uncorrected reference screen information, and the object OBJ1 to the object OBJ6 are located at the positions indicated by the uncorrected object position information.

On the other hand, the reproduction screen PSC11 and the object OBJ1 to the object OBJ6 after remapping are depicted in parts indicated by arrows A43 and A44.

In this example, the position of the reference screen RSC11 in the parts indicated by the arrows A41 and A42 is in the backward direction of the user U11.

Moreover, it is understood that in the parts indicated by the arrows A43 and A44, the object OBJ1, the object OBJ3, and the object OBJ5 after remapping are bilaterally symmetric with the object OBJ2, the object OBJ4, and the object OBJ6 after remapping with respect to the segment that connects the origin O to the central position of the reproduction screen PSC11 in the horizontal direction. That is, it is understood that the positional relation among the objects viewed from the central position of the screen before remapping is substantially the same as that after remapping, and remapping has been performed appropriately.

As described above, when the range of each of the horizontal angles $\varphi_{left}^{nominal}$, $\varphi_{right}^{nominal}$, and $\varphi$ is specified to fall within the range equal to or greater than −180° and equal to or smaller than 180°, the offset angle calculation section 21 calculates the offset angle $\varphi_{offset\_value}$ by conducting calculation represented by Equation (8) in Step S11 of the remapping process described with reference to FIG. 11.

Furthermore, in Step S12, the position information correction section 22 corrects the reference screen information by conducting calculation represented by Equations (9) and (10), and corrects the object position information by conducting calculation represented by Equation (11). Then, in Step S13, the object remapping section 23 calculates the object position information that indicates the remapped positions of the objects by conducting calculation represented by Equations (2) and (7).

In this way, the information processing apparatus 11 can perform appropriate remapping even when the range of each of the horizontal angles $\varphi_{left}^{nominal}$, $\varphi_{right}^{nominal}$, and $\varphi$ is specified to fall within the range equal to or greater than −180° and equal to or smaller than 180°.

Second Modification of First Embodiment

Remapping

Note that the example in which the central position of the reproduction screen PSC11 is identical to the reference position has been described above as a concrete example. However, even when the central position of the reproduction screen PSC11 is not identical to the reference position, it is possible to perform appropriate remapping by conducting correction using an offset angle of the reproduction screen as follows.

Note that description will be continued hereinafter while specifically referring to a case in which reference screen information, object position information, and reproduction screen information depicted in FIG. 15 are given by way of example. In addition, FIG. 15 corresponds to FIG. 5 and description of similar parts in FIG. 15 to those in FIG. 5 will be omitted as appropriate.

In FIG. 15, the reference screen information of the reference screen RSC11 and the object position information of the object OBJ1 to the object OBJ6 are depicted in a part indicated by an arrow Q41. The reference screen information and the object position information of the object OBJ1 to the object OBJ6 are the same as the reference screen information and the object position information of the object OBJ1 to the object OBJ6 depicted in FIG. 5.

Furthermore, the reproduction screen information is depicted in a part indicated by an arrow Q42.

In this example, a position of the reproduction screen PSC11 indicated by the reproduction screen information is a position obtained by rotating the position depicted in the example of FIG. 2 by as much as 180° in the direction of the horizontal angle Azimuth. That is, in the example of FIG. 2, the central position of the reproduction screen PSC11 is identical to the reference position, whereas in the example depicted in FIG. 15, the central position of the reproduction screen PSC11 is a position indicated by a horizontal angle Azimuth=180° and a perpendicular angle Elevation=0°.

When the reference screen information, the object position information, and the reproduction screen information described above are given, the offset angle calculation section 21 calculates the offset angle $\varphi_{offset\_value}$ and also calculates a reproduction screen offset angle $\varphi_{repro\_offset\_value}$ by conducting calculation represented by, for example, the following Equation (12).

[Math. 12]

$$\phi_{repro\_offset\_value} = \frac{\phi_{left}^{repro} + \phi_{right}^{repro}}{2} \quad (12)$$

Note that, in Equation (12), $\varphi_{left}^{repro}$ and $\varphi_{right}^{repro}$ indicate the horizontal angles Azimuth that indicate the positions of the left end and the right end of the reproduction screen PSC11. The information $\varphi_{left}^{repro}$ and $\varphi_{right}^{repro}$ is included in the reproduction screen information.

Furthermore, in addition to correction of the reference screen information and correction of the object position information described above, the position information correction section 22 corrects the reproduction screen information on the basis of the reproduction screen offset angle $\varphi_{repro\_offset\_value}$ in such a manner that the central position of the reproduction screen PSC11 becomes identical to the reference position. That is, the corrected reproduction screen information is calculated by calculation represented by the following Equations (13) and (14).

[Math. 13]

$$\phi_{offset\_left}^{repro} = \phi_{left}^{repro} - \phi_{repro\_offset\_value} \quad (13)$$

[Math. 14]

$$\phi_{offset\_right}^{repro} = \phi_{right}^{repro} - \phi_{repro\_offset\_value} \quad (14)$$

Note that, in Equation (13), $\varphi_{left}^{repro}$ indicates the horizontal angle Azimuth that indicates the position of the left end of the reproduction screen PSC11, and $\varphi_{offset\_left}^{repro}$ indicates a horizontal angle Azimuth after correcting the horizontal angle $\varphi_{left}^{repro}$ using the reproduction screen offset angle $\varphi_{repro\_offset\_value}$. That is, $\varphi_{offset\_left}^{repro}$ indicates the horizontal angle Azimuth that indicates the corrected position of the left end of the reproduction screen PSC11.

Moreover, in Equation (14), $\varphi_{right}^{repro}$ indicates the horizontal angle Azimuth that indicates the position of the right end of the reproduction screen PSC11, and $\varphi_{offset\_right}^{repro}$ indicates a horizontal angle Azimuth after correcting the horizontal angle $\varphi_{right}^{repro}$ using the reproduction screen offset angle $\varphi_{repro\_offset\_value}$. That is, $\varphi_{offset\_right}^{repro}$ indicates the horizontal angle Azimuth that indicates the corrected position of the right end of the reproduction screen PSC11.

Therefore, the horizontal angle $\varphi_{left}^{repro}$ included in the reproduction screen information is corrected by the calculation represented by Equation (13), and the horizontal angle $\varphi_{right}^{repro}$ included in the reproduction screen information is corrected by the calculation represented by Equation (14).

Such a process for calculating the corrected reference screen information is a process for rotating the reproduction screen PSC11 by as much as the reproduction screen offset angle $\varphi_{repro\_offset\_value}$, that is, by as much as a misalignment of the central position of the reproduction screen PSC11 from the reference position. Through this process, the reproduction screen information is corrected in such a manner that the central position of the reproduction screen PSC11 becomes identical to the reference position.

Note that the reproduction screen PSC11 the position of which has been corrected in such a manner that the central position becomes identical to the reference position is also referred to as "corrected reproduction screen PSC11'," hereinafter.

When the corrected reproduction screen information as well as the corrected reference screen information and the corrected object position information is obtained as described above, the object remapping section 23 performs remapping. That is, the position of each object is remapped in conformity with the position of the corrected reproduction screen PSC11'.

Specifically, the object remapping section 23 calculates the object position information after remapping by conducting calculation represented by the following Equation (15) on the basis of the corrected reference screen information, the corrected reproduction screen information, and the corrected object position information.

[Math. 15]

$$\phi' = \begin{cases} \frac{\phi_{offset\_right}^{repro} + 180°}{\phi_{offset\_right}^{repro} + 180°} \\ (\phi_{offset} + 180°) - 180° \end{cases} \quad \text{for} \quad -180° \le \phi_{offset} < \phi_{offset\_right}^{nominal}$$

$$\begin{cases} \frac{\phi_{offset\_left}^{repro} - \phi_{offset\_right}^{repro}}{\phi_{offset\_left}^{nominal} - \phi_{offset\_right}^{nominal}} \\ (\phi_{offset} - \phi_{offset\_right}^{nominal}) + \phi_{offset\_right}^{nominal} \end{cases} \quad \text{for} \quad \phi_{offset\_right}^{nominal} \le \phi_{offset} < \phi_{offset\_left}^{nominal}$$

$$\begin{cases} \frac{180° - \phi_{offset\_left}^{repro}}{180° - \phi_{offset\_left}^{repro}} \\ (\phi_{offset} - \phi_{offset\_left}^{nominal}) + \phi_{offset\_left}^{nominal} \end{cases} \quad \text{for} \quad \phi_{offset\_left}^{nominal} \le \phi_{offset} < 180°$$

(15)

Note that, in Equation (15), φ' indicates the horizontal angle Azimuth that indicates the horizontal position of each object after remapping, and φ$_{offset}$ indicates the horizontal position of the object before remapping, that is, the horizontal angle Azimuth included in the corrected object position information.

Furthermore, in Equation (15), φ$_{offset\_left}^{nominal}$ and φ$_{offset\_right}^{nominal}$ indicate the horizontal angles Azimuth that indicate the corrected horizontal positions of the left end and the right end of the reference screen RSC11. That is, φ$_{offset\_left}^{nominal}$ and φ$_{offset\_right}^{nominal}$ indicate the horizontal angles Azimuth of the left end and the right end of the reference screen RSC11 included in the corrected reference screen information.

Moreover, in Equation (15), φ$_{offset\_left}^{repro}$ and φ$_{offset\_right}^{repro}$ indicate the horizontal angles Azimuth that indicate the horizontal positions of the left end and the right end of the corrected reproduction screen PSC11'.

The object position information after remapping obtained here is for the corrected reproduction screen PSC11'. That is, the information is the object position information when the central position of the reproduction screen PSC11 is identical to the reference position. Actually, however, the reproduction screen PSC11 is at the position indicated by φ$_{left}^{repro}$ and φ$_{right}^{repro}$ included in the reproduction screen information, and is rotated by as much as the reproduction screen offset angle φ$_{repro\_offset\_value}$. Therefore, calculation is conducted as represented by the following Equation (16), and the object position information after remapping is corrected to that for the actual reproduction screen PSC11.

[Math. 16]

$$\phi'' = \phi' + \phi_{repro\_offset\_value} \quad (16)$$

Note that, in Equation (16), φ' indicates the horizontal angle Azimuth included in the object position information after remapping of each object calculated for the corrected reproduction screen PSC11', and φ" indicates a horizontal angle after correcting the horizontal angle φ' using the reproduction screen offset angle φ$_{repro\_offset\_value}$. That is, φ" indicates the horizontal angle Azimuth included in the corrected object position information after remapping.

Each object position after remapping is thereby corrected in conformity with the position of the reproduction screen PSC11.

When remapping described hereinabove is performed while the reference screen information, the object position information, and the reproduction screen information depicted in, for example, FIG. 15 are given, object position information depicted in FIG. 16 is obtained as the object position information after remapping.

Note that, in FIG. 16, in respective fields for "OBJ1" to "OBJ6," the remapped object position information of the object OBJ1 to the object OBJ6, that is, horizontal angles Azimuth and perpendicular angles Elevation of positions of the objects after remapping are depicted.

For example, in fields for the object OBJ1 which is denoted by the character "OBJ1," characters "Azimuth" and "Elevation" indicate horizontal and perpendicular positions of the object OBJ1 after remapping, respectively, and "-170.0" and "4.9" are described as the horizontal angle Azimuth and the perpendicular angle Elevation that indicate those positions. The horizontal angle Azimuth "-170.0" and the perpendicular angle Elevation "4.9" are the horizontal angle φ" calculated as represented by Equation (16) and the perpendicular angle θ' calculated as represented by Equation (2), respectively.

In the example depicted in FIG. 16, the relative positional relation among all the objects OBJ1 to OBJ6 before remapping is substantially the same as that after remapping.

That is, it is understood that the object OBJ1 and the object OBJ2, the object OBJ3 and the object OBJ4, and the object OBJ5 and the object OBJ6 are bilaterally symmetric with each other with respect to the segment that connects the origin O to the central position of the reproduction screen PSC11 in the horizontal direction even after remapping.

Figure 17:
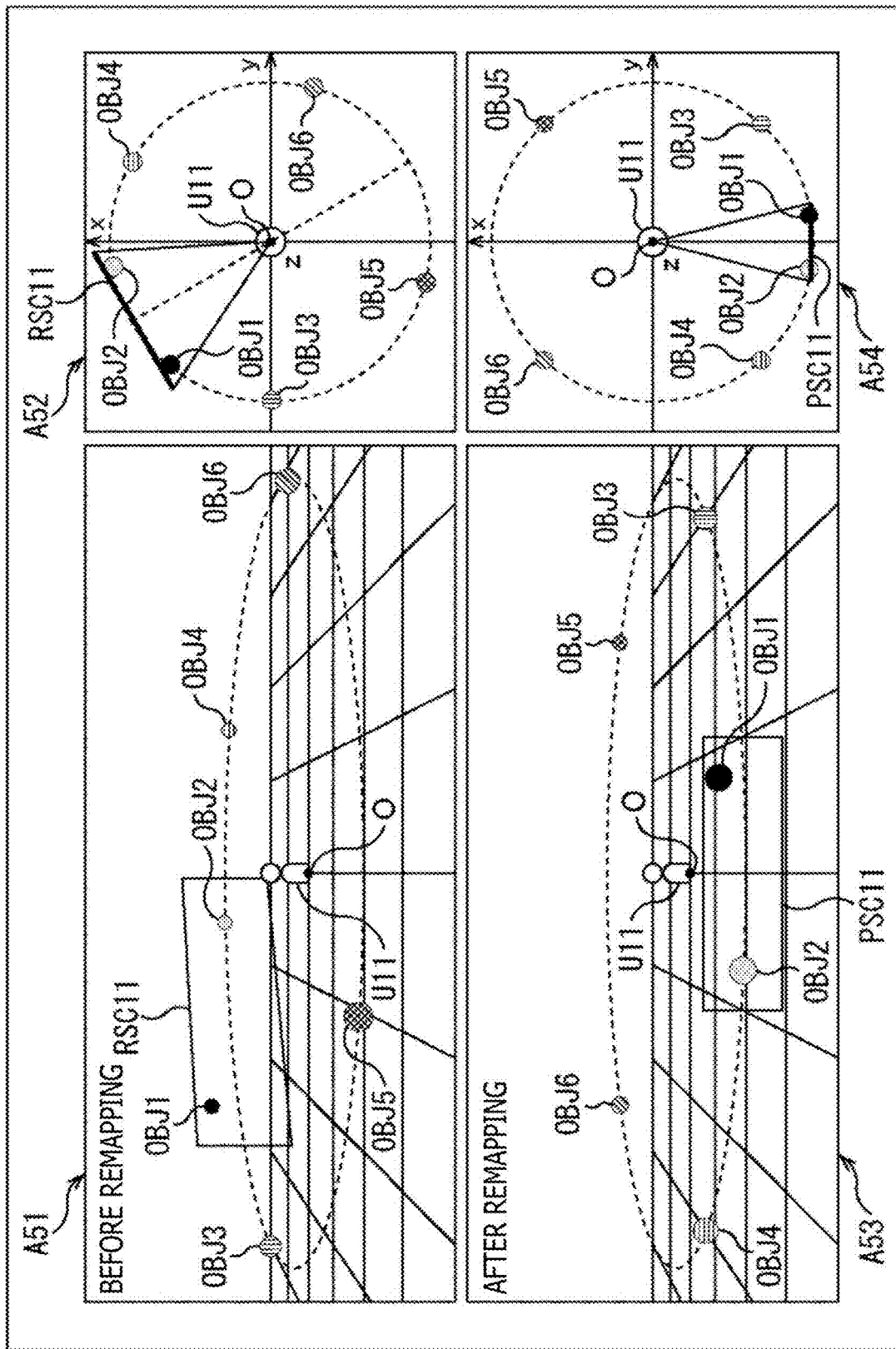
FIG. 17 depicts positional relations among objects before and after remapping.

A pattern diagram of the positional relations among the objects before remapping and after remapping in this example is that depicted in FIG. 17. It is noted that parts corresponding to those in FIG. 1 are denoted by the same reference symbols in FIG. 17 and description of the parts will be omitted as appropriate.

In FIG. 17, the reference screen RSC11 and the object OBJ1 to the object OBJ6 before remapping are depicted in parts indicated by arrows A51 and A52. More specifically, the reference screen RSC11 is located at the position indicated by the uncorrected reference screen information, and the object OBJ1 to the object OBJ6 are located at the positions indicated by the uncorrected object position information.

On the other hand, the reproduction screen PSC11 and the object OBJ1 to the object OBJ6 after remapping are depicted in parts indicated by arrows A53 and A54.

In this example, the reference screen RSC11 and the object OBJ1 to the object OBJ6 before remapping indicated by the arrows A51 and A52 are located at the same positions as those in the example depicted in FIG. 7.

Moreover, it is understood that in the parts indicated by the arrows A53 and A54, the object OBJ1, the object OBJ3, and the object OBJ5 after remapping are bilaterally symmetric with the object OBJ2, the object OBJ4, and the object OBJ6 after remapping with respect to the segment that connects the origin O to the central position of the reproduction screen PSC11 in the horizontal direction. That is, it is understood that the positional relation among the objects viewed from the central position of the screen before remapping is substantially the same as that after remapping, and remapping has been performed appropriately.

Example of Configuration of Information Processing Apparatus

Figure 18:
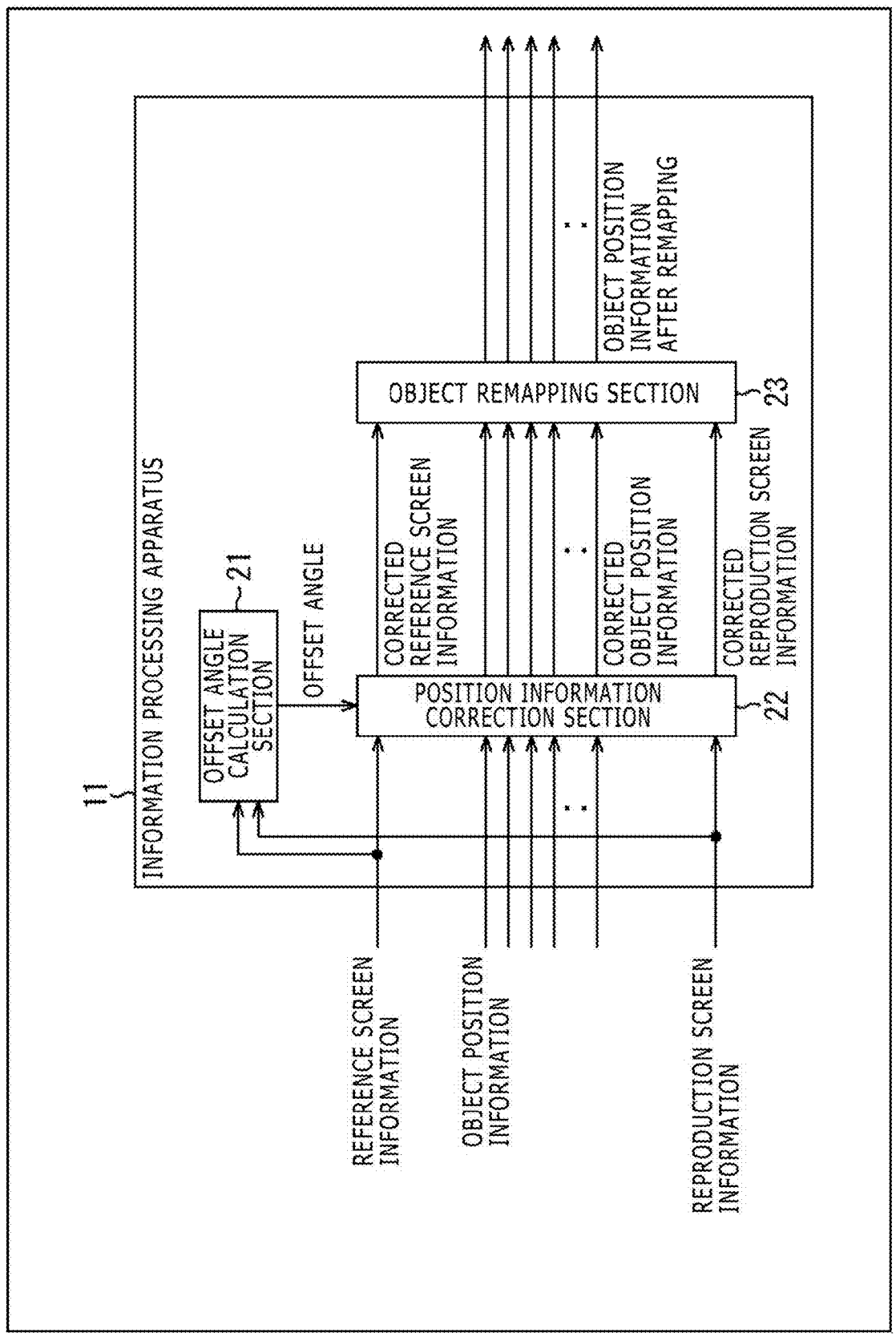
FIG. 18 depicts an example of a configuration of an information processing apparatus.

When performing the processes described above, the information processing apparatus 11 is configured as depicted in, for example, FIG. 18. It is noted that parts corresponding to those in FIG. 8 are denoted by the same reference symbols in FIG. 18 and description of the parts will be omitted as appropriate.

The information processing apparatus 11 depicted in FIG. 18 includes the offset angle calculation section 21, the position information correction section 22, and the object remapping section 23.

In this example, the reproduction screen information is supplied to the offset angle calculation section 21 and the position information correction section 22.

The offset angle calculation section 21 calculates the offset angle $\varphi_{offset\_value}$. In addition, the offset angle calculation section 21 calculates a horizontal angle formed between the front direction of the user U11 present in the reproduction space, that is, the direction from the origin O to the reference position and a direction from the origin O to the central position of the reproduction screen PSC11 as the reproduction screen offset angle $\varphi_{repro\_offset\_value}$ on the basis of the supplied reproduction screen information. The offset angle calculation section 21 supplies the offset angle $\varphi_{offset\_value}$ and the reproduction screen offset angle $\varphi_{repro\_offset\_value}$ to the position information correction section 22.

The reproduction screen offset angle $\varphi_{repro\_offset\_value}$ is a horizontal angle Azimuth that indicates a misalignment amount of the central position of the reproduction screen PSC11 from the reference position in the direction of the horizontal angle Azimuth. That is, the reproduction screen offset angle $\varphi_{repro\_offset\_value}$ is information that indicates an offset amount of the reproduction screen PSC11 from the reference position present in the front direction of the user U11. Note that the information that indicates the offset amount of the reproduction screen PSC11 is not limited to the reproduction screen offset angle $\varphi_{repro\_offset\_value}$ and may be any information.

The position information correction section 22 performs correction to not only obtain the corrected reference screen information and the corrected object position information but also obtain the corrected reproduction screen information. The position information correction section 22 supplies the corrected reference screen information, the corrected object position information, the corrected reproduction screen information, and the reproduction screen offset angle $\varphi_{repro\_offset\_value}$ to the object remapping section 23.

That is, the position information correction section 22 corrects the reproduction screen information supplied from outside on the basis of the reproduction screen offset angle $\varphi_{repro\_offset\_value}$ supplied from the offset angle calculation section 21, and obtains corrected reproduction screen information.

The object remapping section 23 performs remapping of the object position information, that is, each object position on the basis of the corrected reference screen information, the corrected object position information, the corrected reproduction screen information, and the reproduction screen offset angle $\varphi_{repro\_offset\_value}$ supplied from the position information correction section 22, and outputs resultant object position information.

Description of Remapping Process

Figure 19:
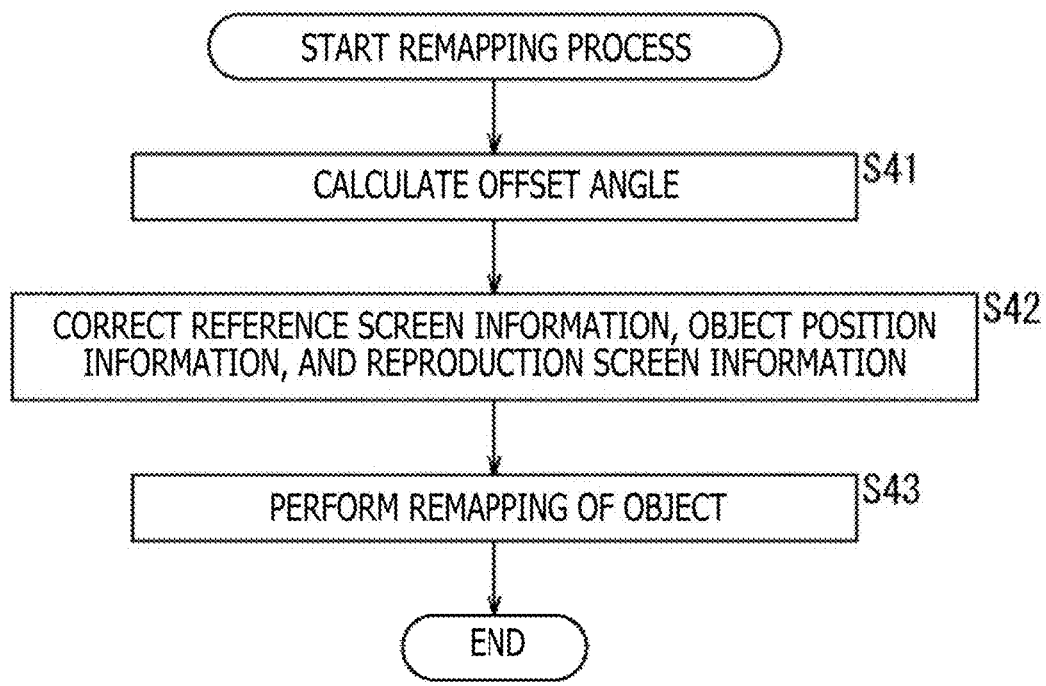
FIG. 19 is a flowchart for explaining a remapping process.

A remapping process performed by the information processing apparatus 11 depicted in FIG. 18 will next be described with reference to the flowchart of FIG. 19.

In Step S41, the offset angle calculation section 21 calculates the offset angle $\varphi_{offset\_value}$ and the reproduction screen offset angle $\varphi_{repro\_offset\_value}$ on the basis of the supplied reference screen information and the supplied reproduction screen information, and supplies the offset angle $\varphi_{offset\_value}$ and the reproduction screen offset angle $\varphi_{repro\_offset\_value}$ to the position information correction section 22.

Specifically, the offset angle calculation section 21 calculates the offset angle $\varphi_{offset\_value}$ by conducting calculation represented by Equation (3). Furthermore, the offset angle calculation section 21 calculates the reproduction screen offset angle $\varphi_{repro\_offset\_value}$ by conducting calculation represented by Equation (12).

In Step S42, the position information correction section 22 corrects the reference screen information, the object position information and the reproduction screen information supplied from outside on the basis of the offset angle $\varphi_{offset\_value}$ and the reproduction screen offset angle $\varphi_{repro\_offset\_value}$ supplied from the offset angle calculation section 21.

For example, the position information correction section 22 corrects the reference screen information and the object position information by performing a similar process to the process of Step S12 in FIG. 11, and obtains the corrected reference screen information and the corrected object position information.

Furthermore, for example, the position information correction section 22 conducts calculation represented by Equations (13) and (14) on the basis of the reproduction screen offset angle $\varphi_{repro\_offset\_value}$, thereby correcting the reproduction screen information and obtaining the corrected reproduction screen information.

The position information correction section 22 supplies the corrected reference screen information, the corrected object position information, the corrected reproduction screen information, and the reproduction screen offset angle $\varphi_{repro\_offset\_value}$ obtained as described above to the object remapping section 23.

In Step S43, the object remapping section 23 performs remapping of each object position on the basis of the corrected reference screen information, the corrected object position information, the corrected reproduction screen information, and the reproduction screen offset angle $\varphi_{repro\_offset\_value}$ supplied from the position information correction section 22.

For example, the object remapping section 23 calculates the object position information that indicates the remapped position of each object by conducting calculation represented by Equations (2), (15), and (16). The object remapping section 23 then outputs the object position information obtained as described above to the subsequent stage, and the remapping process is ended.

In this way, the information processing apparatus 11 performs remapping after correcting the reference screen information, the object position information, and the reproduction screen information. The information processing apparatus 11 then corrects the object position information by as much as a correction of the reproduction screen information. By doing so, it is possible to perform appropriate remapping without dependence on the located positions of the reference screen RSC11 and the reproduction screen PSC11.

In the first embodiment and the first modification of the first embodiment, the example of calculating the offset angle for the horizontal angles and correcting the horizontal angles in each of the reference screen information and the object position information on the basis of the offset angle has been described. However, a similar process may be performed for not only the horizontal angles but also the perpendicular angles and the perpendicular angles in each of the reference screen information and the object position information may be corrected.

In such a case, an offset angle is calculated also for the perpendicular angles in a similar manner to the case for the horizontal angles. The perpendicular angles in the reference screen information and the object position information are corrected on the basis of the calculated offset angle, and remapping is then performed.

Likewise, also in the second modification of the first embodiment, the perpendicular angles in each of the reference screen information, the object position information, and the reproduction screen information may be corrected. Furthermore, the second modification of the first embodiment may be combined with the first modification of the first embodiment.

Moreover, it has been described so far that after the reference screen information and the object position information are corrected in conformity with the reference screen RSC11, the object position information indicating the position of each object after remapping is calculated using the corrected reference screen information and the corrected object position information obtained by the correction. However, only the object position information, that is, the position of each object may be corrected in conformity with the reference screen RSC11.

In such a case, after the offset angle is calculated, the object position information is corrected on the basis of the offset angle and used as the corrected object position information. Subsequently, the remapping of each object position is performed on the basis of the corrected object position information, the reference screen information, and the reproduction screen information. That is, the object position information that indicates the position of each object after remapping is calculated.

Meanwhile, a series of processes described above can be either executed by hardware or executed by software. When a series of processes is executed by software, a program constituting the software is installed into a computer. Here, types of the computer include a computer incorporated into dedicated hardware, a computer, for example, a general-purpose personal computer, capable of executing various functions by installing various programs into the computer, and the like.

FIG. 20 is a block diagram illustrating an example of a configuration of the hardware of the computer executing a series of processes described above by the program.

In a computer, a CPU (Central Processing Unit) 501, a ROM (Read Only Memory) 502, and a RAM (Random Access Memory) 503 are mutually connected by a bus 504.

An input/output interface 505 is also connected to the bus 504. An input section 506, an output section 507, a recording section 508, a communication section 509, and a drive 510 are connected to the input/output interface 505.

The input section 506 includes a keyboard, a mouse, a microphone, an imaging element, and the like. The output section 507 includes a display, a loudspeaker, and the like. The recording section 508 includes a hard disk, a nonvolatile memory, and the like. The communication section 509 includes a network interface and the like. The drive 510 drives a removable recording medium 511 such as a magnetic disk, an optical disk, a magneto-optical disk or a semiconductor memory.

In the computer configured as described above, the CPU 501 loads a program recorded in, for example, the recording section 508 to the RAM 503 via the input/output interface 505 and the bus 504 and executes the program, whereby a series of processes described above is performed.

The program executed by the computer (CPU 501) can be provided by, for example, recording the program in the removable recording medium 511 serving as a package medium or the like. Alternatively, the program can be provided via a wired or wireless transmission medium such as a local area network, the Internet, or digital satellite broadcasting.

In the computer, the program can be installed into the recording section 508 via the input/output interface 505 by attaching the removable recording medium 511 to the drive 510. Alternatively, the program can be received by the communication section 509 via the wired or wireless transmission medium and installed into the recording section 508. In another alternative, the program can be installed into the ROM 502 or the recording section 508 in advance.

Note that the program executed by the computer may be a program for performing processes in time series in an order described in the present specification or may be a program for performing the processes either in parallel or at necessary timing such as timing of calling.

Moreover, the embodiments of the present technique are not limited to the embodiments described above and various changes and modifications can be made without departing from the spirit of the present technique.

For example, the present technique can have a cloud computing configuration for causing a plurality of apparatuses to process one function in a sharing or cooperative fashion.

Furthermore, each step described in the above flowcharts can be not only executed by one apparatus but also executed by a plurality of apparatuses in a sharing fashion.

Moreover, when one step includes a plurality of processes, the plurality of processes included in the one step can be not only executed by one apparatus but also executed by a plurality of apparatuses in a sharing fashion.

Furthermore, the present technique can be configured as follows.

(1)

An information processing apparatus including:

an offset calculation section that calculates an offset amount of a position of a reference screen from a reference position present in a front direction of a user;

a position correction section that corrects a position of an audio object referred with the reference position, in conformity with the position of the reference screen on the basis of the offset amount; and a remapping section that remaps the position of the audio object in conformity with a position of a reproduction screen on the basis of the corrected position of the audio object.

(2)

The information processing apparatus according to (1), in which the offset calculation section corrects the offset amount by a predetermined correction value when the reference screen is placed in a backward direction of the user.

(3)

The information processing apparatus according to (1) or (2), in which the position correction section adjusts a correction value used during correction of the position of the audio object when a range of information that indicates the position of the audio object is specified as a range within a predetermined range.

(4)

The information processing apparatus according to any one of (1) to (3), in which the position correction section corrects the position of the reference screen on the basis of the offset amount, and the remapping section remaps the position of the audio object on the basis of the corrected position of the reference screen and the corrected position of the audio object.

(5)

An information processing method including the steps of:

calculating an offset amount of a position of a reference screen from a reference position present in a front direction of a user;

correcting a position of an audio object referred with the reference position, in conformity with the position of the reference screen on the basis of the offset amount; and remapping the position of the audio object in conformity with a position of a reproduction screen on the basis of the corrected position of the audio object.

(6)

A program for causing a computer to execute a process including the steps of:

calculating an offset amount of a position of a reference screen from a reference position present in a front direction of a user;

correcting a position of an audio object referred with the reference position, in conformity with the position of the reference screen on the basis of the offset amount; and remapping the position of the audio object in conformity with a position of a reproduction screen on the basis of the corrected position of the audio object.

REFERENCE SIGNS LIST

11: Information processing apparatus
21: Offset angle calculation section
22: Position information correction section
23: Object remapping section

The invention claimed is:

1. An information processing apparatus comprising:
   a bit stream input section that inputs a bit stream including a position of an audio object and a position of a reference screen;
   an offset calculation section that calculates an offset amount of the position of the reference screen from a reference position present in a front direction of a user;
   a position correction section that corrects the position of the audio object referred with the reference position, in conformity with the position of the reference screen on the basis of the offset amount; and
   a remapping section that remaps the position of the audio object in conformity with a position of a reproduction screen on the basis of the corrected position of the audio object.

2. A method comprising:
   inputting, by a bit stream input section, a bit stream including a position of an audio object and a position of a reference screen;
   calculating, by an offset calculation section, an offset amount of the position of the reference screen from a reference position present in a front direction of a user;
   correcting, by a position correction section, the position of the audio object, in conformity with the position of the reference screen on a basis of the offset amount; and
   remapping, by a remapping section, the position of the audio object in conformity with a position of a reproduction screen on a basis of the corrected position of the audio object.

3. A non-transitory computer readable medium on which is stored a computer program which, when implemented by a computer, cause the computer to implement steps of:
   inputting, by a bit stream input section, a bit stream including a position of an audio object and a position of a reference screen;
   calculating, by an offset calculation section, an offset amount of the position of the reference screen from a reference position present in a front direction of a user;
   correcting, by a position correction section, the position of the audio object, in conformity with the position of the reference screen on a basis of the offset amount; and
   remapping, by a remapping section, the position of the audio object in conformity with a position of a reproduction screen on a basis of the corrected position of the audio object.

* * * * *